(12) United States Patent
Boller et al.

(10) Patent No.: US 9,135,093 B2
(45) Date of Patent: Sep. 15, 2015

(54) EVENT-DRIVEN APPROACH FOR COLLECTING MONITORING DATA OF MESSAGING SYSTEMS

(75) Inventors: Stefan Boller, Heidelberg (DE); Waldemar Befort, Hockenheim (DE); Tihomir Stoyanov, Sofia (BG); Steffen Henning, Malsch (DE)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 13/601,241

(22) Filed: Aug. 31, 2012

(65) Prior Publication Data

US 2014/0068629 A1    Mar. 6, 2014

(51) Int. Cl.
G06F 9/54 (2006.01)
G06F 13/00 (2006.01)
G06F 11/30 (2006.01)
G06F 11/07 (2006.01)

(52) U.S. Cl.
CPC ............ *G06F 9/542* (2013.01); *G06F 11/0709* (2013.01); *G06F 11/0751* (2013.01); *G06F 11/30* (2013.01); *G06F 11/3006* (2013.01); *G06F 11/3072* (2013.01); *G06F 13/00* (2013.01)

(58) Field of Classification Search
None
See application file for complete search history.

(56) References Cited

U.S. PATENT DOCUMENTS

| | | | |
|---|---|---|---|
| 5,757,771 A * | 5/1998 | Li et al. ........................ | 370/235 |
| 8,056,091 B2 | 11/2011 | Brunswig et al. | |
| 2006/0149787 A1 * | 7/2006 | Surlaker et al. ............... | 707/200 |
| 2010/0241535 A1 * | 9/2010 | Nightengale et al. ........... | 705/30 |
| 2011/0167433 A1 * | 7/2011 | Appelbaum et al. .......... | 719/318 |
| 2012/0030275 A1 | 2/2012 | Boller et al. | |
| 2012/0054334 A1 | 3/2012 | Befort | |
| 2012/0144251 A1 * | 6/2012 | Carey et al. ..................... | 714/57 |
| 2013/0074102 A1 * | 3/2013 | Carey et al. ................... | 719/318 |

OTHER PUBLICATIONS

U.S. Appl. No. 13/103,430, filed May 9, 2011, entitled "Component Independent SAP PI Message Monitoring".

U.S. Appl. No. 13/299,155, filed Nov. 17, 2011, entitled "Component Independent Process Integration Message Search Application".

* cited by examiner

*Primary Examiner* — Andy Ho
*Assistant Examiner* — Abdou Seye
(74) *Attorney, Agent, or Firm* — Fish & Richardson P.C.

(57) ABSTRACT

The present disclosure relates to software, computer systems, and computer implemented methods for providing centralized process integration (PI) domain alert monitoring. One process includes identifying at least one alert rule at a central rules repository, the at least one alert rule associated with at least one message inter-communication within a process integration (PI) domain, where the PI domain includes at least one PI component, and where the message inter-communications within the PI domain occur between PI components. At least one alert consumer registration associated with at least one alert consumer system for an identified alert rule is identified. Information associated with the at least one identified alert rule from the central rules repository is distributed to the corresponding PI component associated with the message inter-communication linked to the alert rule and to the at least one registered alert consumer system.

19 Claims, 16 Drawing Sheets

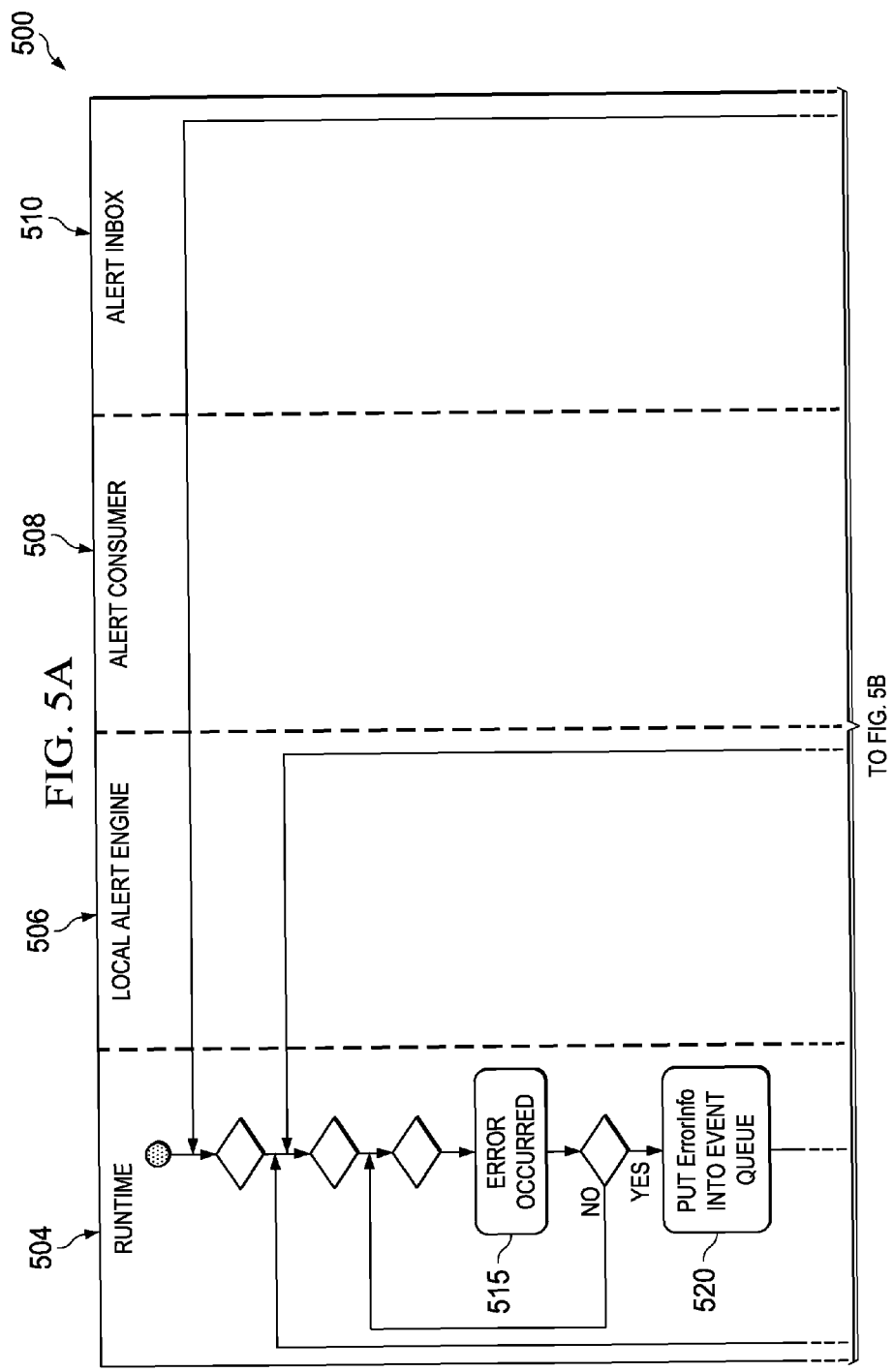

FIG. 10C

| Alert Inbox | | | | | | |
|---|---|---|---|---|---|---|
| Auto Refresh | Every 5 Minutes ▼ | Refresh | | | | |

Alerts for Central Adapter Engine: B4Y only (22) / Adapter Engine: VXJ Alerts (1) / Central Adapter Engine: X12 Alerts (1) / Central Adapter...

▷ Show Quick Criteria Maintenance

View: [Standard View] ▼ | Confirm | Postponement ▽ | Show Action Log | Navigate to ▽ |

| Alert Name | Category | Managed Object | Type | Current |
|---|---|---|---|---|
| Component Self-Test Alert for ABAP Proxy | ⚠ | ABAP Proxy U8R_105 | □ | □ |
| Component Self-Test Alert for ABAP Proxy | ⚠ | ABAP Proxy U8R_107 | □ | □ |
| Component Self-Test Alert for ABAP Proxy | ⚠ | ABAP Proxy XI2_105 | □ | □ |
| Component Self-Test Alert for ABAP Proxy | | | | |
| Component Self-Test Alert for ABAP Proxy | ⚠ | Integration Directory: XI2 | | |
| Message Alerting Alert: XIVERI_7_3_1_JavaEnd2EndTest_AlertRule | ⚠ | Central Adapter Engine: A8Z | | 1032 |
| Message Alerting Alert: DEFAULT_ALERTRULE | ⚠ | Central Integration Engine: XI2_001 | | |

Alerts - "Message Alerting Alert: DEFAULT_ALERTRULE" at "Central Integration Engine: XI2_001"

Timeframe [All] ▼ | From: | at: 00:00:00 | To: | at: 23:59:59 |
Export ▽ | Confirm | Assign | Show Details | Create Incident | Create Notification |  Filter Settings — 1034

| Rating | ERROR_L... | IFLOW... | MESSAGE_ID | RECEIVER_ATTRIBUT... | SENDER_ATTRIBUTES |
|---|---|---|---|---|---|
| ✗ | 1110 | | B2CED973113911E1AFD900801E541D16 | &&& | &j:_crd_sender&ElementsO |
| ✗ | 1120 | | B535676311DB11E1CBCE00001E541D16 | &&& | &j:_crd_sender&OrderServ |
| ✗ | 1200 | | 219CA30B0E9C11E1A7CC00001E541D16 | &&& | &BS_QPT002&SI_WS_Syn |

1030

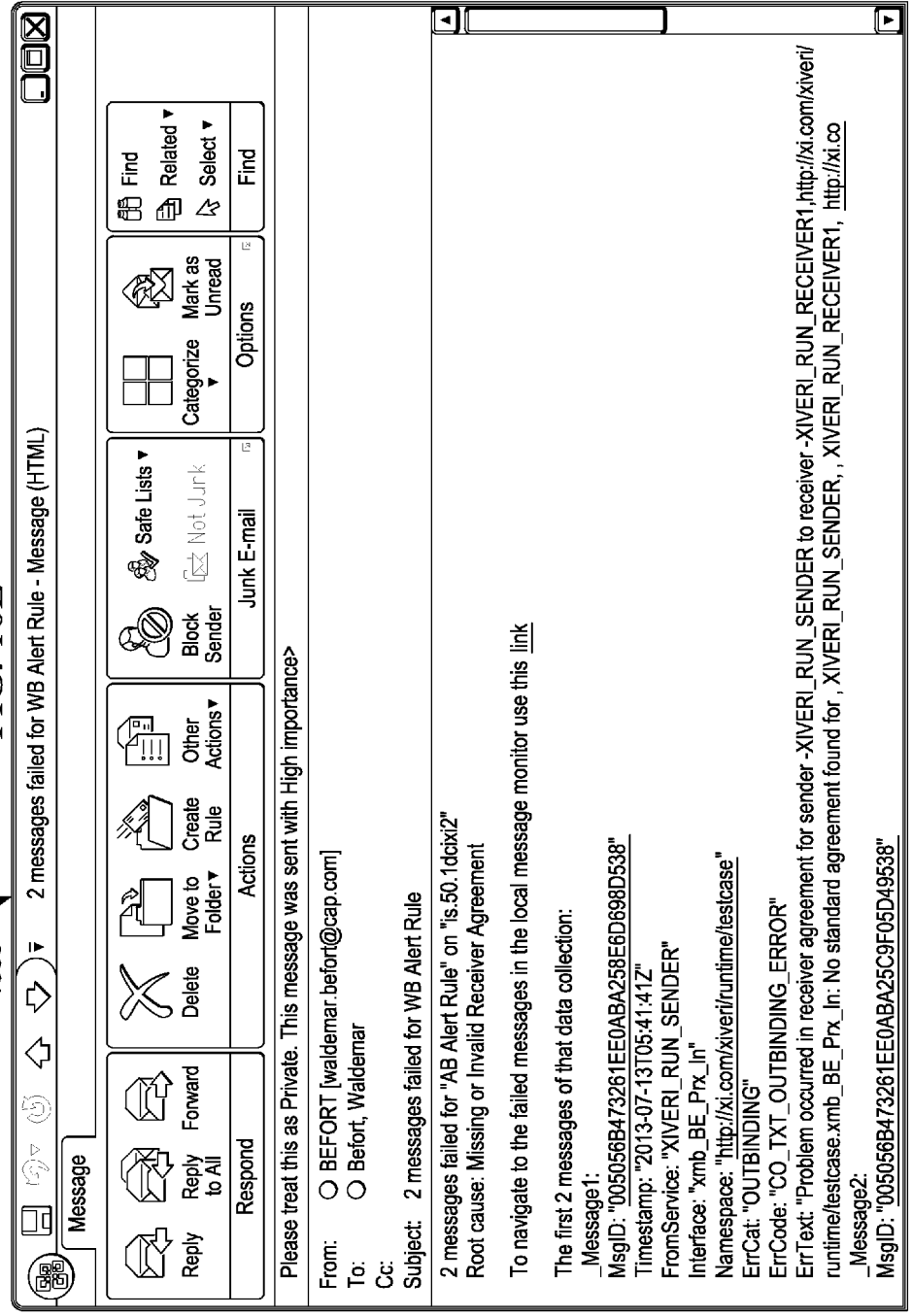

EVENT-DRIVEN APPROACH FOR COLLECTING MONITORING DATA OF MESSAGING SYSTEMS

TECHNICAL FIELD

The present disclosure relates to software, computer systems, and computer implemented methods for providing centralized process integration (PI) domain alert monitoring and distributed collection of alert messages.

BACKGROUND

Today's companies and entities employ multiple disparate computing systems in various enterprise and inter-enterprise organizations, where certain computing systems perform different parts of an overall business function. As an example, a scenario such as processing an incoming order may involve the participation of a customer relationship management (CRM) system, an enterprise resource management (ERM) system, a supply chain management (SCM) system, and one or more financial management (FM) systems, as well as others. The integration of the systems to perform one or more processes is referred to as process integration. In some instances, a set of systems used to perform specific functionality and operations may be defined to represent a specific process integration (PI) domain.

To monitor the various systems included in a PI domain, PI runtime components (or "PI components") may run on, along with, or in combination with the systems to capture technical information about the overall operations of the PI domain, as well as to determine the process and success of messages and events occurring on or in connection with those PI components. Each PI component can collect a set of information associated with the messages and events that occur on the PI component's associated system.

SUMMARY

The present disclosure relates to software, computer systems, and computer implemented methods for providing centralized process integration (PI) domain alert monitoring. One process includes identifying at least one alert rule at a central rules repository, the at least one alert rule associated with at least one message inter-communication within a process integration (PI) domain, where the PI domain includes at least one PI component, and where the message inter-communications within the PI domain occur between PI components. At least one alert consumer registration associated with at least one alert consumer system for an identified alert rule is identified. Information associated with the at least one identified alert rule from the central rules repository is distributed to the corresponding PI component associated with the message inter-communication linked to the alert rule and to the at least one registered alert consumer system.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 10A-E are example screenshots of various dashboards and interactions provided through use of an appropriate system, such as the system described in FIG. 1A.

DETAILED DESCRIPTION

Figure 1A:
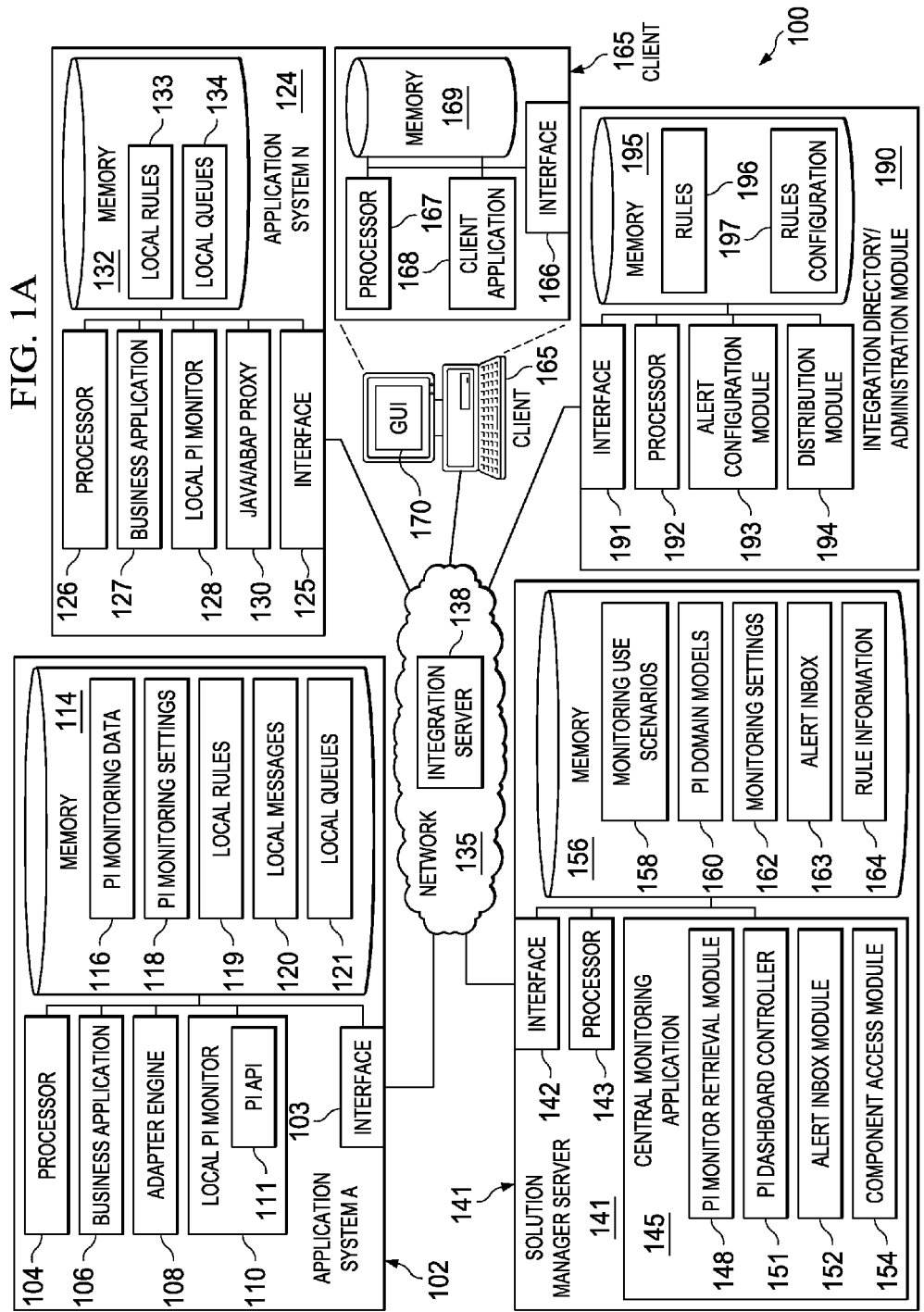
FIGS. 1A and 1B illustrate an example environment for collecting monitoring data from a distributed business process using various process integration (PI) components.

This disclosure generally describes computer systems, software, and computer implemented methods for providing centralized process integration (PI) domain message processing status monitoring, centralized message alert rules, and staged, event-driven alert event collection in distributed systems involved in message processing. Previously, PI monitoring operations were performed on a PI component-by-component basis, requiring users to access each PI component in a distributed system to review monitoring and other status information collected during the operation of those components. Further, alert rules for message processing errors and other events during message processing previously required rules to be set individually at each PI component, and any related messages associated with those rules needing to be accessed at the corresponding PI component. In other words, previous systems provided local monitoring and alerting applications for different components, but failed to provide a centralized monitoring system allowing users, technical analysts, and system administrators to be provided an overall view and status of complex systems. Some systems may have numerous PI components collecting information through various local monitoring applications, making system-wide monitoring and collection of alert information related to messages and messaging processes of system administrators difficult.

The present disclosure describes a system where centrally orchestrated calls to PI components associated with a particular PI domain are used to retrieve information on processed messages and events previously monitored at the various PI components. In some instances, a central monitoring application can access the information through one or more application programming interfaces (APIs) associated with the various PI components. The information collected by the central monitoring application may include some, all, or none of the following details: (1) message and event metadata (e.g., message header data) such as the integration scenario a particular message or event is associated with, the technical channels through which a message was sent, etc.; (2) statistics associated with one or more monitored messages; and (3) status information on the relative success or failure of particular monitored messages. Additional information may be collected in some implementations, including some or all of the message content (payload) included in or associated with particular messages or events. The data, once collected, can be stored at the central system (or made accessible thereto) and aggregated for reporting and monitoring purposes. One or more alert rules associated with particular message patterns can be defined at a central administration system. Those alert rules can identify the particular PI components with which the message pattern is associated, and the central administration system can assist in deploying those alert rules to those PI components, at which they can be stored and evaluated during message processing. Further, one or more systems internal to or external from the PI domain can register as alert consumers associated with particular alerts, with listeners and other agents used to monitor one or more queues at the particular PI components. Each PI component can identify those alert consumers and the alert rules associated with their registration, and create one or more sub-queues associated with each particular alert consumer. The listeners and other agents of the alert consumers can collect the alert-related messages stored in queues which are consumer-specific, allowing for alert information to be securely, efficiently and easily collected by alert consumers directly from the PI components associated with the corresponding alert rule.

In some implementations, aggregation and association of particular messages and events by the central monitoring application may be based, not on a message globally unique identifier (GUID) basis, but instead, on certain metadata attributes associated with the collected messages. By aggregating/correlating individual messages processing events based on the metadata (usually generated by the local monitoring applications), the procedure helps to save valuable systems resources, memory load, and storage on the consumer side. Further, the content of particular messages becomes less important, allowing technical users to take a macro-level view of the PI domain and its associated operations to identify and address system-wide issues unrelated to the particular content within individual messages. In addition this helps in avoiding the creation of too many individual notifications (alerts), as only if an event is received which is different from the known combinations of certain meta attributes a new alert group would be created which then results in new notifications. This mechanism helps to avoid getting spammed with notifications for already known alert groups respectively patterns.

To address the issues, algorithms determining the success, temporary success, or failure of particular messages and events sent or existing within the PI domain and among various PI components are used. In some instances, a message may be considered successful from the aspect of a first PI component, in the fact that it was successfully sent by the first PI component's associated system, while as a whole, the message was a failure, as a later system monitored by a second PI component failed to process or forward the message at a later time Alert messages can be centrally configured for various end-to-end message paths, and, once activated, can be automatically distributed to the corresponding PI components associated with those end-to-end message paths. The messages can be evaluated at each local PI component based on the activated rules, with alert messages being generated when an issue arises. Those alert messages can then be collected by one or more registered consumer systems who register for a particular alert rule of interest to that system. In some instances, the consumer systems can register their interest in a particular rule at a centralized administration system, with the consumer systems then provided with information on the PI component associated with the particular alert rule. Those consumer systems, or agents thereof, can monitor the appropriate PI components at which the alerts are generated, without needing to monitor other systems or components that are not associated with the alert rules of interest.

Information on the relative success or failure of certain messages can be presented to technical users through various dashboards presenting summary information on the status of one or more PI domains and their associated PI components. Further, users can be provided additional details as to specific message types, interactions, and other information included in or derived from the collected sets of information. The presented information can be used to locate specific areas of concern, including information on messages, PI components, and other portions of the PI domain and related systems in which errors, warnings, exceptions, and other issues have occurred. Once those areas are located, the dashboard can provide functionality allowing users to attempt to resend (or initiate) a failed message, such as to test whether an error associated with the message and its message path components continues. The dashboard may also allow technical users to generate one or more helpdesk tickets based on observed issues occurring within the system, allowing the person(s) or organization(s) associated with observed issues to be notified and address the issues as soon as possible. In other words, the collected information and the generated dashboard allow users to view the statistics and information associated with particular PI domains in a single location, as opposed to requiring users to access each PI component individually. Additionally, the described dashboard can provide an export functionality that, for example, can be used to report upon processed message volume for a given time period (i.e., Last Month, Last Week, etc.), which can provide detailed information and reports on the messages. The export functionality can generate forms and customized reports for use in analyzing the associated systems, providing users and administrators with detailed information on the status of multiple PI domains and their systems.

Various dashboards and user interfaces (UIs) associated with viewing information regarding alert rules and messaging status may be provided, as well as configuration dashboards/UIs for creating and activating new alert rules. The dashboards can be used by both technical and non-technical users to determine which messaging exchanges to be monitored in a particular PI domain, and with which particular PI components. As the system provides a centralized location, dashboards, and UIs for managing the alert rules, the difficulties identified with prior systems can be minimized.

Turning to the illustrated example, FIG. 1A illustrates an example environment 100 for collecting and managing monitoring data from a distributed business process using various process integration (PI) components. The illustrated environment 100 includes, or is communicably coupled with, one or more application systems 102, 124, a solution manager server 141, an integration server 138, one or more clients 165, and an integration directory and/or administration module 190 (hereafter, "integration directory 190"). At least some of the components can communicate across or via network 135. In general, environment 100 depicts an example configuration of a system capable of collecting, at the solution manager server 141, information associated with messages and events occurring at a plurality of application systems 102, 124, including the messages sent between those systems 102, 124. Additionally, each application system 102, 124 can also locally evaluate messages (including their payload data and contents) received and/or sent by corresponding business applications 106, 127 based on one or more local alert rules 119 distributed from the central integration directory 190. Without the described solution, users must be present at or logged into the individual application systems 102, 124 to access the stored messages and to define individual alert rules. The present solution may allow the users and administrators to define one or more centralized alert rules 196 to be associated with particular end-to-end messaging sent between various PI components, where the alert rules 196 are then automatically distributed to each of the PI components associated with the end-to-end messaging. Those rules 196 can be stored locally as local rules 119 and evaluated on a local runtime component basis to generate a local set of alerts and events at each component. Consumer systems (in some instances, e.g., solution manager server 141) can register with the integration directory 190 for particular alert rules 196 of interest, Once registered, the consumer systems can receive information on which PI components the alert rules affect, so that the consumer systems can listen to or follow the particular PI components for retrieving messages and alerts generated at those particular components, The consumer systems, such as the solution manager server 141, may further include or be associated with an alert inbox 163, where the collected alert and messaging information from the PI components can be managed and processed.

The application systems 102, 124 may each represent a single system within a distributed business process, where each system performs a particular task associated with the business process. For example, application system A 102 and application system N 124 may each comprise a portion of a CRM system for receiving and processing customer orders. In other instances, application system A 102 may be part of a CRM system, while application system N 124 may be a part of an ERP system performing tasks related to or associated with the CRM system. Based on their relationship, the two application systems 102, 124 may be defined as two parts of the same PI domain. Still further, in some instances, the application systems 102, 124 may represent different portions of the same physical system virtually distinguished or separated based on the functionality and/or operations they perform. While only two application systems are illustrated, other implementations may include only one or more than two application systems. In alternative implementations, some or all of the illustrated elements may be included in or associated with different and/or additional systems/servers, clients, networks, or locations other than those illustrated in FIG. 1A. For example, the components illustrated within the solution manager server 141 may be included in multiple servers, parts of one or more cloud-based networks, or other locations accessible to the solution manager server 141 (e.g., either directly or via network 135).

In general, the solution manager server 141 is any server or system that stores and executes a central monitoring application 145 used to monitor one or more application systems (e.g., 102, 124) associated with or included in one or more PI domain models (or definitions) 160 and/or monitoring use scenarios 158. For example, the solution manager server 141 may be a Java™ 2 Platform, Enterprise Edition (J2EE®)-compliant application server that includes Java™ technologies such as Enterprise JavaBeans® (EJB), J2EE® Connector Architecture (JCA), Java™ Messaging Service (JMS), Java™ Naming and Directory Interface (JNDI), and Java™ Database Connectivity (JDBC). In some instances, the solution manager server 141 may store a plurality of various other applications, while in other instances, the solution manager server 141 may be a dedicated server specifically meant to store and execute the central monitoring application 145 and its related functionality. In some implementations, the solution manager server 141 may also provide other monitoring and system administration tools. In some instances, the solution manager server 141 may comprise a web server or be communicably coupled with a web server, where the central monitoring application 145 represents a web-based (or web-accessible) application accessed and executed on one or more of the associated clients 165 to perform the programmed tasks or operations of the central monitoring application 145. In still other instances, the solution manager server 141 may be a consumer that registers with the integration directory 190 for monitoring one or more alert rules 196. As a consumer, the integration directory 190 can provide the solution manager server 141 information on the alert rules 196, including which PI components and systems are involved or associated with the particular alert rule 196. Those components and/or systems can then be monitored by the solution manager server 141 to identify alert and event messages associated with particular alert rules 196.

At a high level, the solution manager server 141 comprises an electronic computing device operable to receive, transmit, process, store, or manage data and information associated with the environment 100. The solution manager server 141 illustrated in FIG. 1A can be responsible for receiving requests from one or more clients 165 (as well as any other entity or system interacting with the central monitoring application 145), responding to the received requests by processing said requests through the inherent functionality and components of the central monitoring application 145, and sending the appropriate responses from the central monitoring application 145 (including a generated or updated dashboard visualization) back to the requesting client 165 or other system. The central monitoring application 145 can also process and respond to local requests from a user locally accessing the solution manager server 141. In some instances, the central monitoring application 145 can actively access one or more local PI monitors 110 associated with one or more application systems to perform one or more functions related to message retrieval or monitoring. Accordingly, in addition to requests from the clients 165 illustrated in FIG. 1A, requests may also be sent from internal users, external or third-party customers, and other applications, as well as any other appropriate entities, individuals, systems, or computers. In some instances, the central monitoring application 145 may be a web-based application executing monitoring functionality associated with a networked or cloud-based distributed business process. In many instances, the solution manager server 141 may act as a consumer for collecting messaging alerts and events, and may interact with one or more of the application systems 102, 124 and their corresponding PI components.

As used in the present disclosure, the term "computer" is intended to encompass any suitable processing device. For example, although FIG. 1A illustrates a single solution manager server 141, environment 100 can be implemented using any number of servers, as well as computers other than servers, including a server pool. Indeed, the solution manager server 141 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the illustrated solution manager server 141 may be adapted to execute any operating system, including Linux, UNIX, Windows, Mac OS®, or any other suitable operating system. According to one implementation, the solution manager server 141 may also include or be communicably coupled with a mail server.

In the illustrated implementation of FIG. 1A, the solution manager server 141 includes an interface 142, a processor 143, a memory 156, and a central monitoring application 145. The interface 142 is used by the solution manager server 141 to communicate with other systems in a client-server or other distributed system environment (including within environment 100) connected to the network 135 (e.g., an associated client 165, application systems 102, 124, as well as other systems communicably coupled to the network 135). FIG. 1A depicts both a server-client environment, but could also represent a cloud computing network. The interface 142 generally comprises logic encoded in software and/or hardware in a suitable combination and operable to communicate with the network 135. More specifically, the interface 142 may comprise software supporting one or more communication protocols associated with communications such that the network 135 or the interface's hardware is operable to communicate physical signals within and outside of the illustrated environment 100.

Generally, the solution manager server 141 may be communicably coupled with a network 135 that facilitates wireless or wireline communications between the components of the environment 100 (i.e., between the solution manager server 141 and one or more of the clients 165, or between different application systems 102, 124), as well as with any other local or remote computer, such as additional clients, servers, or other devices communicably coupled to network 135, including those not illustrated in FIG. 1A. In the illustrated environment, the network 135 is depicted as a single network, but may be comprised of more than one network without departing from the scope of this disclosure, so long as at least a portion of the network 135 may facilitate communications between senders and recipients. In some instances, one or more of the components associated with the solution manager server 141 may be included within the network 135 as one or more cloud-based services or operations. For example, the integration server 138 is illustrated as within the network 135, and may be operated at least partially within a cloud-based system in network 135. The network 135 may be all or a portion of an enterprise or secured network, while in another instance, at least a portion of the network 135 may represent a connection to the Internet. In some instances, a portion of the network 135 may be a virtual private network (VPN). Further, all or a portion of the network 135 can comprise either a wireline or wireless link. Example wireless links may include 802.11a/b/g/n, 802.20, WiMax, and/or any other appropriate wireless link. In other words, the network 135 encompasses any internal or external network, networks, sub-network, or combination thereof operable to facilitate communications between various computing components inside and outside the illustrated environment 100. The network 135 may communicate, for example, Internet Protocol (IP) packets, Frame Relay frames, Asynchronous Transfer Mode (ATM) cells, voice, video, data, and other suitable information between network addresses. The network 135 may also include one or more local area networks (LANs), radio access networks (RANs), metropolitan area networks (MANs), wide area networks (WANs), all or a portion of the Internet, and/or any other communication system or systems at one or more locations. The network 135, however, is not a required component in all implementations of the present disclosure.

As illustrated in FIG. 1A, the solution manager server 141 includes a processor 143. Although illustrated as a single processor 143 in the solution manager server 141, two or more processors may be used in the solution manager server 141 according to particular needs, desires, or particular embodiments of environment 100. The processor 143 may be a central processing unit (CPU), a blade, an application specific integrated circuit (ASIC), a field-programmable gate array (FPGA), or another suitable component. Generally, the processor 143 executes instructions and manipulates data to perform the operations of the solution manager server 141 and, specifically, the functionality associated with the corresponding central monitoring application 145. In one implementation, the server's processor 143 executes the functionality required to receive and respond to requests and instructions from the one or more clients 165 using the central monitoring application 145, as well as the operations used to access processed message information from the one or more application systems 102, 124 and their PI components.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 143 executes the central monitoring application 145 (and its associated functionality) on the solution manager server 141. In some instances, a particular solution manager server 141 may be associated with the execution of two or more central monitoring applications 145, as well as two or more instances of a single central monitoring application 145, as appropriate.

At a high level, the central monitoring application 145 is any application, program, module, process, or other software that may execute, change, monitor, and manage information associated with one or more application systems 102, 124, and those systems' associated PI components. In some instances, portions of the central monitoring application 145 may operate in response to and in connection with one or more requests received from a client 165 via network 135. Additionally, the central monitoring application 145 may operate independently based on a set of monitoring use scenarios 158, one or more defined PI domain models 160, a set of monitoring settings 162, a set of rule information 164 associated with one or more alert rules and defining one or more PI components for analysis, monitoring, and information collection. In some instances, portions of the central monitoring application 145 may represent a web-based application accessed and executed (at least in part) by one or more external clients 165 or other suitable entities via network 135 (e.g., through the Internet). In general, the central monitoring application 145 may perform three functions, as well as any number of additional and/or related operations. First, the central monitoring application 145 can retrieve sets of messaging and event information from one or more application systems 102, 124 associated with a particular alert rule 196 for which the solution manager server 141 has registered and is consuming, and store those sets of retrieved information in an alert inbox 163 used to store, aggregate, and present alert rule data at the solution manager server 141. By defining the alert rules 196 at a centralized location (i.e., the integration directory 190), and allowing the solution manager server 141 (and its central monitoring application 145) to access the particular systems associated with a previously registered alert rule. Thus, the central monitoring application 145 can access sets of relevant alert data and other related information from the several PI components associated with the alert rules without needing to access or poll each message received or processed at each application system, thus saving time and resources on the production systems or machines. Instead, statistics on various messages, events, and alerts within particular message scenarios can be accessed, which can then be correlated to one or more related messages.

Second, the central monitoring application 145 can, in response to requests from technical users, analysts, and other suitable and/or authorized users, generate and present the aggregated alert inbox 163 providing an overview of the statuses associated with various message alerts and events occurring throughout a system or environment, such as environment 100, as well as the results of particular, registered, alert rules and related issues. In some instances, the central monitoring application 145 (or a related application) can generate, update, and maintain different dashboards and other visualizations presenting the collected information requested. Among other functionality, the central monitoring application 145 may also be used to fix errors identified once the alert rule results are analyzed or reviewed. For example, the central monitoring application 145 may be used to generate a helpdesk ticket for technical support, or, in some cases, attempt to resend or re-execute one or more messages or events that have experienced errors or have otherwise failed or been associated with a particular alert rule. The central monitoring application 145 may perform other operations to assist in monitoring various systems and the messages and events occurring therein.

While illustrated as internal to the solution manager server 141, one or more processes associated with the central monitoring application 145 may be stored, referenced, or executed remotely. For example, a portion of the central monitoring application 145 may be a web service associated with the central monitoring application 145 that is remotely called, while another portion of the central monitoring application 145 may be an interface object or agent bundled for processing at a remote client 165. Moreover, any or all of the central monitoring application 145 may be a child or sub-module of another software module or enterprise application (not illustrated) without departing from the scope of this disclosure. Still further, portions of the central monitoring application 145 may be executed or accessed by a user working directly at the solution manager server 141, as well as remotely at a corresponding client 165. The central monitoring application 145 is illustrated as including a PI monitor retrieval module 148, a PI dashboard controller 151, a component access module 154, and an alert inbox module 152. All, some, none, or different modules may be included in different implementations of the central monitoring application 145. Additionally, some or all of the modules may be combined with each other, as well as integrated into the functionality provided by another component.

The PI monitor retrieval module 148 accesses the local logs and monitoring information of the PI monitoring data 116 stored at individual application systems (i.e., 102, 124) and retrieves that information for storage at one or more centralized locations. In some instances, the retrieved information may be stored as part of the alert inbox 163. The PI monitor retrieval module 148 can access the information stored on the application systems through APIs defined and exposed at the individual systems, such as the PI API 111 illustrated within a local PI monitor located on application system A 102 or one or more APIs exposed by the adapter engine 108, also located on the application system A 102. Alternative and/or additional methods of retrieving the information from the different application systems may also be used. In some instances, information may be sent from the application systems 102, 124 to the central monitoring application 145, such as in response to a request from the central monitoring application 145. The application systems 102, 124 associated with a particular PI monitor retrieval module 148, as well as the frequency and type of information retrieved, may be determined based on one or more parameters defined at the solution manager server 141. In the alert rule environment, the central monitoring application 145 may use one or more listening or other monitoring agents (not shown) to monitor and retrieve alert rule-related information generated by one or more of the application systems 102, 124 and their respective PI components. These agents may be activated or initialized upon registration with the integration directory 190 for a particular alert rule 196.

As previously described, the alert information and data that includes information retrieved from the various application systems is located in memory 156 of the solution manager server 141, and may be associated with an alert inbox 163. Memory 156 is used for storing data and program instructions associated with the solution manager server 141 and, more specifically, the central monitoring application 145. The memory 156 may include any memory or database module and may take the form of volatile or non-volatile memory including, without limitation, magnetic media, optical media, random access memory (RAM), read-only memory (ROM), removable media, or any other suitable local or remote memory component. The memory 156 may store various objects or data, including classes, frameworks, applications, backup data, business objects, jobs, web pages, web page templates, database tables, process contexts, and any other appropriate information including any parameters, variables, algorithms, instructions, rules, constraints, or references thereto associated with the purposes of the solution manager server 141 and its central monitoring application 145. In some implementations, including cloud-based systems, some or all of the memory 156 may be stored remote from, but communicably coupled to, the solution manager server 141. As illustrated, memory 156 includes one or more monitoring use scenarios 158, one or more PI domain model definitions 160, one or more monitoring settings 162, an alert inbox 163, and a set of rule information 164 associated with any registered alert rules associated with the solution manager server 141.

The set of PI domain model definitions 160 describes or defines one or more PI components that are included in one or more PI domains. Each PI domain can be defined to include a set of PI components associated with one or more business components performing a particular task or set of tasks. The PI components included in a particular PI domain may be automatically associated with one another in some instances, or manually assigned, in others. In some instances, the PI components in different PI domains may overlap, such that some PI components are included in different PI domains. Examples may include PI domains associated with related business processes where some of the PI components may be used in both situations (i.e., creating a purchase order and fulfilling a purchase order). A set of PI components is logically grouped into a PI domain based on the processes and operations being monitored. The PI components making up a particular PI domain can include various runtime components that monitor and capture message and event information during execution of a system and its business processes. Some PI components may be involved in message processing, while other PI components may be involved in other processing. Each PI component is executing or running on a technical system, such as a system executing ABAP-based programs and tools or a system executing Java-based programs and tools, including the application systems 102, 124 illustrated in FIG. 1A. In some instances, more than one PI component may be running on a single technical system. Examples of PI components include adapter engines (e.g., adapter engine 108 of application system A 102) and proxies (i.e., Java/ABAP proxy 130), although other components can also be used as PI components.

Returning to FIG. 1A, the set of PI domain model definitions 160 can provide the central monitoring application 145 with information on what PI domains exist in an environment, as well as the PI components (and their associated application systems or components) that make up the PI domain. The central monitoring application 145 can determine from a particular PI domain model 160 the PI components to be accessed for information regarding a particular PI domain 160. As an example, one PI domain associated with environment 100 may include the two illustrated application systems 102, 124, as well as one or more other components/systems. The set of monitoring use scenarios 158 may be used to determine the type of information to be retrieved from the PI components associated with a particular PI domain. Alternatively, the set of monitoring use scenarios 158 may be used to determine the type of information that is relevant in a particular use case. In some monitoring use scenarios, a portion of the metadata stored at some PI components may not be necessary or relevant to the scenario, and therefore may not be collected by the PI monitor retrieval module 148. In some instances, administrators and other users may specify that a particular monitoring use scenario 158 is to be associated with a particular PI domain 160. That association can be read by the PI monitor retrieval module 148 to determine the information to be accessed and collected in a particular monitoring situation. The monitoring use scenario 158 associated with a particular PI domain 160 can be changed at different intervals or in response to particular events or other triggers, including a threshold number of errors identified for messages, wherein a more detailed monitoring use scenario 158 may be applied. In some instances, the monitoring use scenario 158 may be manually selected, while in others, a default or dynamically determined monitoring use scenario 158 can be applied to a particular PI domain 160. The monitoring settings 162 may also be associated with different PI domains 160, as well as individual PI components. The monitoring settings 162 can be used to determine the frequency of information and data collection performed by the central monitoring application 145, and may provide different collection frequencies on a per PI domain basis, as well as on a per PI component basis. The specific parameters defined by the monitoring settings 162 can be defined manually, provided a default value, or dynamically determined based on information associated with or related to the different technical systems (i.e., the application systems 102, 124) and/or the monitoring use scenario 158.

The central monitoring application 145 is also illustrated as including a PI dashboard controller 151. The PI dashboard controller 151 uses the collected data to generate and provide one or more dashboards presenting the human-readable results to technical users, administrators, and other entities. The generated dashboards can be used to display information regarding different subsets of information, such as general monitoring information and messaging data (not shown), as well as the alert-related event and messaging data associated with the alert inbox 163 and the registered alert rules monitored by the central monitoring application 145. In some instances, the information included in the generated dashboards can initially begin at a high-level of data, providing general information on the types of messages and events occurring in a particular domain. Still further, the initial step in using the generated dashboards may be determining a particular PI domain (where multiple PI domains are monitored) for which to view relevant data. Once a particular PI domain is selected, relevant information associated with that PI domain can be displayed in the generated dashboard. The PI dashboard controller 151 can provide tools in the generated display to allow technical users to define one or more filters on the data to be presented, as well as allowing users to focus on different aggregated data sets or analyses performed on the different aggregated data sets. The PI dashboard controller 151 can interpret the filter request and generate the appropriate dashboard in response to the filter selection. The types of dashboard views available may include dashboards providing general information about the operations of the messaging components, as well as dashboards specific to the alert rules registered for consumption by the solution manager server 141. Those alert rule-related dashboards may include, among others, an alert rules configuration dashboard associated with the solution manager (FIG. 10B), an example alert inbox dashboard (FIG. 10C), and a second example alert inbox dashboard (FIG. 10D). FIG. 10E illustrates an example alert email generated using one of the example alert inbox dashboards. Other suitable dashboards and interfaces may also be provided in various implementations. In general, the PI dashboard controller 151 can generate, maintain, and manipulate one or more dashboards associated with the alert rule-related information collected by the central monitoring application 145, usually in response to specific user requests and interactions.

The central monitoring application 145 is further illustrated as including a component access module 154. The component access module 154 is used to access various exposed APIs associated with different systems within a PI domain (and associated with one or more PI components) in order to interact with the systems in the PI domain. For example, the component access module 154 can take input received via a presented dashboard and, in response, request that a particular message, alert, or event for which information is presented within the dashboard be re-initiated or cancelled. This interaction with the various technical systems (i.e., the application systems 102, 124) may be available because the solution manager server 141 and its components are provided information for each of the technical systems associated with a particular PI component. During a setup procedure, connections may be established between the central monitoring application 145 (and specifically, the component access module 154) and the technical systems to allow the central monitoring application 145 to perform certain actions on the technical systems. In some instances, remote function call (RFC) destinations for one or more applications on the remote technical system may be identified and stored on the solution manager server 141. When a particular action associated with a technical system is identified in the dashboard, the component access module 154 can identify the connection associated with the technical system and use that connection, through exposed APIs, for example, to pass the values and information necessary to execute the requested action. The component access module 154 is the component of the central monitoring application 145 that performs the calls to these APIs and that controls the actions and events in response to input received through a presented dashboard and interpreted by the PI dashboard controller 151. In some instances, the component access module 154 can act as an agent of the central monitoring application 145 to access and retrieve alert messages and related events from one local queues 121, 134 associated with PI components for which the solution manager server 141 has registered to consume related messages. The component access module 154 can access the set of rule information 164 which defines the one or more alert rules for which the solution manager server 141 has registered, as well as the corresponding PI components and/or their associated application systems where the relevant alert information is stored.

The central monitoring application 145 also includes an alert inbox module 152. The alert inbox module 152 provides the central monitoring application 145 with the ability to manage and assist in the presentation of the various information on registered alert rules being consumed by the solution manager server 141. The alert inbox module 152 can organize one or more stored set of alert information (not illustrated) stored in memory 156, and can allow users to view, sort, and review alert information. In some instances, the stored set of alert information may be stored in an alert inbox 163, and can be stored in a sorted manner according to the one or more related alert rules. In some instances, the alert inbox module 152 may be a part of or associated with the PI dashboard controller 151 to present alert rule-related information. In some instances, the alert inbox module 152 may also be used to define one or more new alert rules for the solution manager server 141 to consume, as well as to manage and configure currently registered alert rules.

As described, the central monitoring application 145 of the solution manager server 141 collects information from different application systems 102, 124 included in different, defined PI domains 160. The application systems 102, 124 themselves may be any system or server involved in executing one or more business processes via one or more business applications 106, 127. Similar to the solution manager server 141, the applications systems 102, 124 may be J2EE®-compliant application servers that include various Java technologies. In some instances, the application systems 102, 124 may include and execute two or more business applications, while in other instances, the application systems 102, 124 may execute a single, dedicated business application. Each of the application systems 102, 124 may be comprised, at least in part, of a web server, where the business applications 106, 127 (or portions thereof) represent web-based applications or processes that can be executed on a remote client 165. Each of the application systems 102, 124 may be systems for executing different processes associated with one or more business processes, and further, the different application systems may be related to each other, in that the business applications 106, 127 may be used together to complete different end-to-end business processes or events. Each application system 102, 124 may be operable by a user local to the systems, as well as through one or more clients 165 communicably coupled to the systems via the network 135. Each application system 102, 124 may represent different hardware configurations, as well as a single server or system using virtualized systems such that application system 102 and application system 124 are co-located on a single server or overall system.

As illustrated, each application system 102, 124 includes an interface 103, 125, a processor 104, 126, the business applications 106, 127, a local PI monitor 110, 128 (sometimes including a PI API 111), and a memory 114, 132. The interfaces, processors, and memories may be similar to or different than those described in the solution manager server 141 (i.e., interface 142, processor 143, and memory 156). The local PI monitors 110, 128 illustrated on the application systems 102, 124 may be components used to perform local monitoring operations in association with the operations on each application system 102, 124. In some instances, the local PI monitors 110, 128 may be legacy monitoring components previously used to collect relevant monitoring information associated with the messages and events of the business applications 106, 127 and/or the application systems 102, 124 as a whole. In some instances, the local PI monitors 110, 128, may be capable of evaluating one or more local rules 119, 133 to determine whether a specific alert rule 196 (as distributed by the integration directory) is satisfied. In some instances, the PI APIs 111 can be used by the component access modules 154 of the solution manager server 141 (or other suitable consumers of alert messages) to access the local queues 121 of alert information stored locally at each application system 102, 124 via the corresponding local PI monitors 110. The information collected by the local PI monitors 110, 128 may include any information relevant to the events or messages performed, received, sent, or executed at each application system 102, 124, as well as alert-specific information collected based on the set of local rules 119. The relevant information can be stored by the local PI monitors 110, 128 into the corresponding memory 114, 132 (i.e., in the set of PI monitoring data 116 included in memory 114 of application system A 102, or the illustrated local message stores 120 (not illustrated in application system N 124), or the local queues 121, 134). Local PI monitoring settings 118 may determine or define the type and sets of information to be monitored by the local PI monitor 110, 128. Although not illustrated in application system N 124, application system N 124 may include the same or similar information and data sets as those illustrated in application system A 102. As illustrated, the local PI monitor 110 of application system A 102 may include a PI API 111 exposing various methods for accessing the monitored information associated with the system 102. In some instances, the PI monitor retrieval module 148 may use these APIs 111 to access the information stored with the set of PI monitoring data 116. Alternatively, the PI monitor retrieval module 148 may directly access the sets of PI monitoring data 116 without using the APIs, in some instances.

As illustrated, the respective memories 114, 132 can also include a local message store 120, although it is not illustrated in application system N 124. The local message stores 120 store information associated with each message received at and/or sent by the respective application system 102, 124, including at least a portion of the payload data for at least some of the messages. The local message stores 120 may comprise a single location or a plurality of locations within a particular application system. Further, the memories 114, 132 are illustrated as including the local alert rules 119, 133 that are received from the integration directory 190 in response to particular alert rules 196 associated with those application systems' corresponding PI components. Any messages and alerts generated at the runtime components can be evaluated with respect to the alert rules 119, 133 that are active at the respective components, where any alerts and/or messages satisfying those rules can be placed in the local queues 121, 134 and thus be available for further processing or review. While not illustrated in FIG. 1, each of the local queues 121 may be comprised of a master queue and one or more sub-queues. A component associated with the local queues 121, 134 may review the master queue and identify a particular sub-queue in which the alert messages relate. In many instances, the sub-queues may correspond to the consumers and other systems monitoring the PI component for alerts and events related to a particular (and activated) alert rule 196. Additional information on the operations of the local queues 121, 134 is described in relation to FIG. 3.

Application system A 102 is illustrated as including an adapter engine 108. The adapter engine 108 may be considered a PI component associated with a particular PI domain. The adapter engine 108 may be a separate software component used by a particular system 102 to communicate and exchange information with one or more other systems, such as application system N 124 and/or the integration server 138. The adapter engine 108 can be used to translate incoming messages received at and outgoing messages sent from the application system A 102 to one or more other systems. In some instances, the adapter engine 108 may be used to translate messages and events sent to and received from the integration server 138, where the integration server 138 controls or manages the sending of messages within the system (and a particular PI domain). Using the adapter engine 108 in combination with the execution of the business application 106, information relevant to a distributed process, including messages sent between different systems, can be monitored. In some instances, the local PI monitor 110 can be associated with the adapter engine 108 to identify and monitor incoming and outgoing messages as appropriate, storing the relevant information in the set of PI monitoring data 116.

Application system N 124 is illustrated as including a Java or ABAP proxy 130. Similar to the adapter engine 108 described above, the proxy 130 allows for messages to be sent and received by application system N 124 through a message protocol or language readable by application system N 124 and its business application 127, as well as for other applications and systems in a particular environment. In general, the proxy 130 can be used to encapsulate the creation or parsing of XML messages and the communication with the relevant runtime components required to send or receive messages. The proxy 130 allows systems to exchange messages with different communication parties, as well as through the use of the adapter engine 108 and the integration server 138.

Figure 1B:
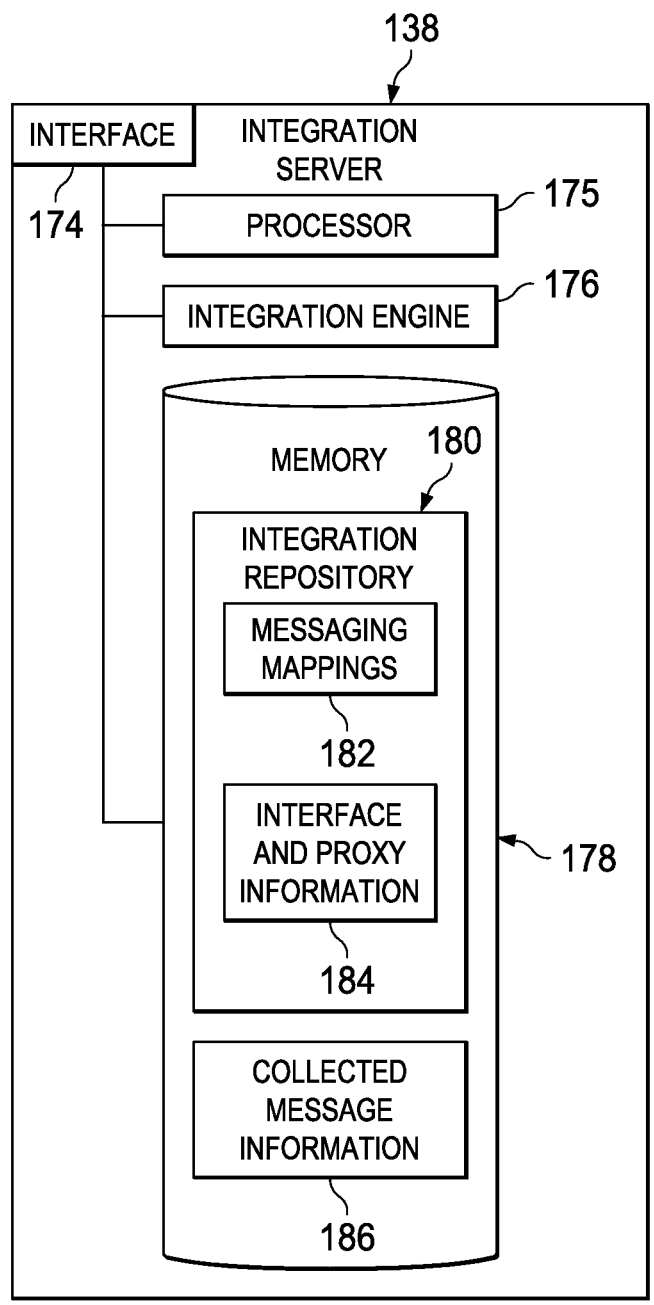

The integration server 138 is a runtime system for receiving, processing, and forwarding messages between different systems within an environment, such as environment 100. In some instances, all messages sent between the different systems 102, 124 may be sent via the integration server 138, while in other instances, some or all of the messages may be sent directly between the different systems 102, 124 without using the integration server 138. As illustrated in FIG. 1B, the integration server 138 includes interface 174, processor 175, memory 178, and an integration engine 176. The interface 174, processor 175, and memory 178 may be similar to or different than those described for the solution manager server 141, with the components associated with the operations of the integration engine 176. In general, the integration server 138 may facilitate interaction between diverse operating systems and application systems across internal and external networks (e.g., 135). In some instances, messages between different application systems 102, 124 can be sent to the integration server 138 first, where the integration engine 176 interprets the messages, determines the corresponding receiver of the message, and forwards or relays the message to the corresponding receiver system. Information on the messages sent via the integration server 138 can be stored in the set of collected message information 186. The information can be viewed locally on the integration server 138, or collected by the PI monitor retrieval module 148 and included in the local data sets stored at the various application systems 102, 124 for processing, display, and analysis. Memory 178 stores information used by the integration engine 176 to perform its operations, including the information in the integration repository 180. The integration repository 180 includes information defining integration scenarios, integration processes, interfaces and proxy information 184, and messaging mappings 182 between different components in the system. The interfaces and proxy information 184 may be used to create interfaces, adapters, and proxies within the environment 100, as well as to determine the appropriate messaging schema and format for exchanging messages between systems. The messaging mappings 182 may define the paths different types of messages may take between components, allowing the integration engine 176 to analyze a particular message and determine the appropriate receiver system, using the interface and proxy information 184 to modify the particular message into the appropriate format, where needed. The integration engine 176, or a monitoring component (not illustrated), can extract and store information associated with the received, sent, and forwarded messages and events occurring at or performed by the integration server 138 to the set of collected message information 186. As illustrated in FIG. 1A, the integration server 138 may be located in a cloud-based system within network 135. Alternatively, the integration server 138 may be a component within an on-premise or other conventional system, as well.

Returning to FIG. 1A, the illustrated environment includes one or more clients 165. The clients 165 may be associated with a particular application system 102, 124, or the solution manager server 141 and its central monitoring application 145, as well as other systems, including systems for monitoring alert rules similar to the solution manager server 141. Each client 165 may be any computing device operable to connect to or communicate with at least one of the application systems 102, 124 or solution manager server 141 using a wireline or wireless connection, via the network 135, or another suitable communication means or channel. In some instances, the client 165 may be a part of or associated with a business process involving one or more of the application systems, while in other instances, the client 165 may be associated with an administrator or monitoring account used in association with the central monitoring application 145 or other suitable portion of the environment 100. In general, each client 165 includes a processor 167, an interface 166, a client application 168, a graphical user interface (GUI) 170, and a memory 169. In general, client 165 comprises an electronic computing device operable to receive, transmit, process, and store any appropriate data associated with the environment 100 of FIG. 1A. It will be understood that there may be any number of clients 165 associated with, or external to, environment 100. For example, while illustrated environment 100 includes a single client 165, alternative implementations of environment 100 may include multiple clients communicably coupled to the one or more of the systems illustrated. In some instances, at least one client 165 may be associated with an administrator of the environment, and may be capable of accessing and interacting with the central monitoring application 145, and, in many instances, the integration directory 190, where one or more alert rules 196 can be defined and configured by modifying the rules configuration 197. Additionally, there may also be one or more additional clients 165 external to the illustrated portion of environment 100 capable of interacting with the environment 100 via the network 135. Further, the terms "client" and "user" may be used interchangeably as appropriate without departing from the scope of this disclosure. Moreover, while each client 165 is described in terms of being used by a single user, this disclosure contemplates that many users may use one computer, or that one user may use multiple computers.

The GUI 170 associated with each client 165 may comprise a graphical user interface operable to, for example, allow the user of a client 165 to interface with at least a portion of the central monitoring application 145 and its associated operations and functionality, including the one or more dashboards generated by the PI dashboard controller 151. Generally, the GUI 170 provides the particular user with an efficient and user-friendly presentation of business data provided by or communicated within the system. The GUI 170 may comprise a plurality of customizable frames or views having interactive fields, pull-down lists, and buttons operated by the user. For example, the GUI 170 may provide interactive elements that allow a user to interact with a particular business application 106, 127, the central monitoring application 145, or the integration directory 190, as well as other components within and/or external to environment 100. The different portions of functionality provided by the central monitoring application 145 and the integration directory 190 may be presented and accessible to the user through the GUI 170, such as through a client application 168 (e.g., a web browser). Generally, the GUI 170 may also provide general interactive elements that allow a user to access and utilize various services and functions of a particular business application 106, 127. In some instances, the client application 168 may be used to access various portions of different application systems, including the PI monitoring data 116 and/or local messages 120 and local queues 121 collected on a specific application system 102, 124, as well as the alert rules 196 on the integration directory 190. In some instances, the client application 168 may be used to access (and the GUI 170 used to view) information retrieved directly from an application system 102, 124. Alternatively, the client application 168 may be used to access and manipulate the central monitoring application 145 and/or the integration directory 190, including as an administrator capable of modifying the operations and parameters associated with the monitoring of one or more PI domains, the various alert rules 196, as well as the definitions and boundaries of a particular PI domain. In some instances, the client application 168 may be an agent or client-side version of the central monitoring application 145 and/or the integration directory 190 (and its alert configuration module 193). The GUI 170 may present the information of the client application 168 for viewing and interaction. In general, the GUI 170 is often configurable, supports a combination of tables and graphs (bar, line, pie, status dials, etc.), and is able to build real-time portals, where tabs are delineated by key characteristics (e.g., site or micro-site). Therefore, the GUI 170 contemplates any suitable graphical user interface, such as a combination of a generic web browser, intelligent engine, and command line interface (CLI) that processes information in the platform and efficiently presents the results to the user visually.

As used in this disclosure, each client 165 is intended to encompass a personal computer, touch screen terminal, workstation, network computer, kiosk, wireless data port, smart phone, personal data assistant (PDA), one or more processors within these or other devices, or any other suitable processing device. For example, each client 165 may comprise a computer that includes an input device, such as a keypad, touch screen, mouse, or other device that can accept user information, and an output device that conveys information associated with the operation of one or more application systems 102, 124, those system's business applications 106, 127, the central monitoring application 145, the alert configuration module 193 of the integration module 190, and/or the client 165 itself, including digital data, visual information, or the GUI 170. Both the input and output device may include fixed or removable storage media such as a magnetic storage media, CD-ROM, or other suitable media, to both receive input from and provide output to users of client 165 through the display, namely, the GUI 170. The client's 165 processor 167, interface 166, and memory 169 may be similar to or different from those described in connection with the other components illustrated in FIG. 1A, although alternative implementations of one or more of these components may be used, as well as implementations where additional components may also be included.

As described, FIG. 1A further includes the integration directory 190. The integration directory 190 is generally meant to provide a central location and system for managing a plurality of alert rules 196 defined throughout a particular one or more PI domains. In general, the integration directory 190 may be similar in physical definition to the solution manager server 141 in that it may be a server, workstation, or other suitable computer system. As illustrated, the integration directory 190 includes an interface 191, a processor 192, an alert configuration module 193, a distribution module 194, and a memory 195. The interface 191, processor 192, and memory 195 may be similar to or different from the other memories previously described.

Memory 195 specifically includes a set of alert rules 196 and a set of alert rule configurations 197. The alert rules 196, as described, can be defined to identify particular alerting-related events associated with one or more PI components, as well as threshold criteria or requirements for an alert to be triggered or identified at runtime. The rules configuration 197 can store information defining one or more consumers of the alert rules 196, allowing the rules to be distributed to interested and registered consumer systems and the PI components associated with those rules. The alert configuration module 193 can be an application, program, or other software that allows one or more users to create, modify, delete, and activate specific alert rules 196, as well as to register for specific alert rules 196 to follow. The alert configuration module 193 may be associated with one or more UIs that allow users to specify their alert-related rules and configurations. The rules configuration 197 can store information on which systems and runtime components are associated to specific rules, as well as information defining the specific rule registrations of consuming systems. The registration information can be used to distribute the alert rules 196 to the proper PI components and to the proper registered alert consumers. The distribution module 194 can perform operations associated with the distribution of the alert rules 196 to the appropriate locations (i.e., PI components, application systems 102, 124, solution manager server 141, or other alert consumers.

Figure 2:
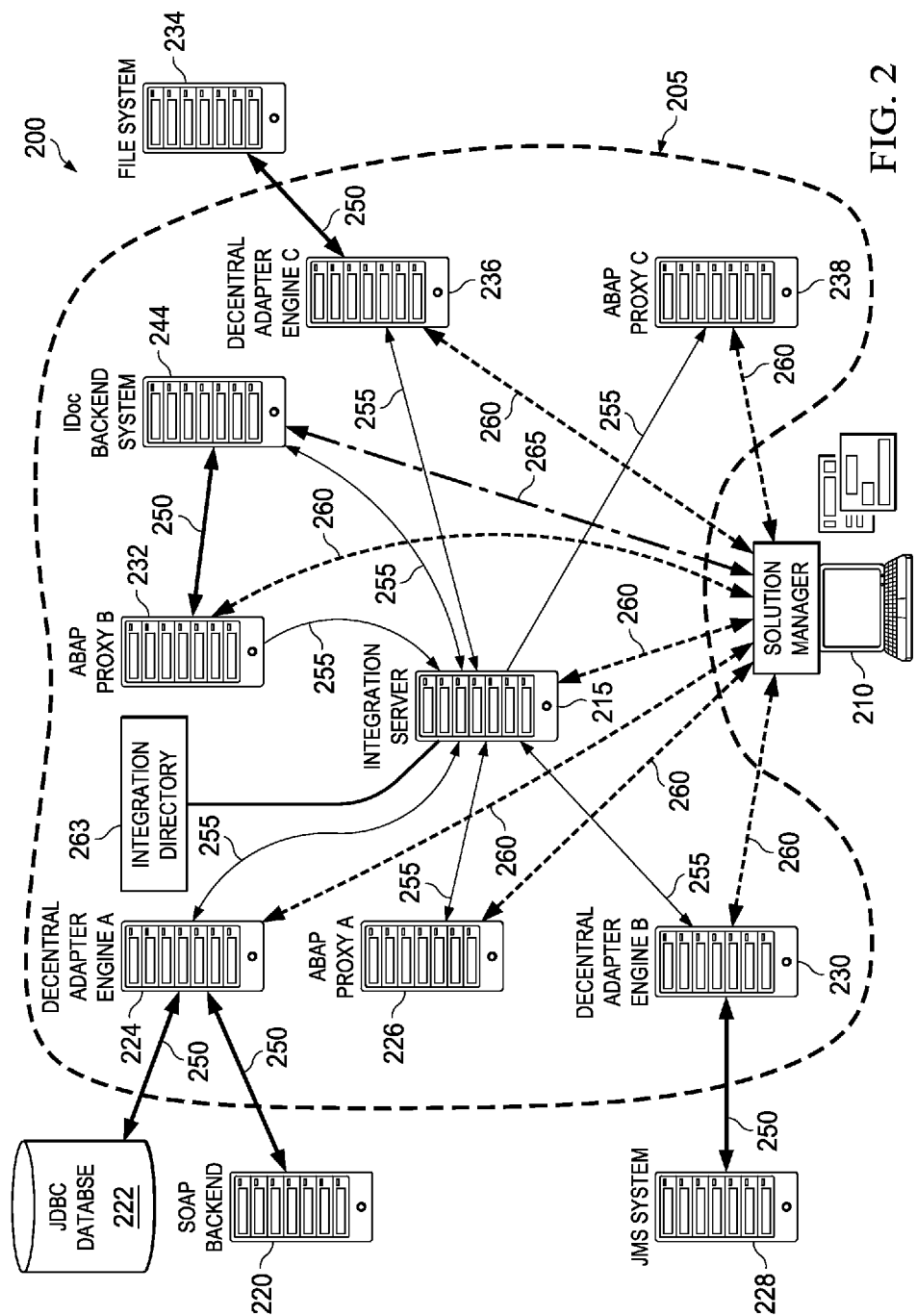
FIG. 2 illustrates a diagram of an example PI domain defined in a distributed system used to centrally monitor a plurality of business process systems.

FIG. 2 illustrates a diagram 200 of an example PI domain 205 defined in a distributed system used to centrally monitor a plurality of business process systems in an end-to-end manner. The PI domain 205 is based on a definition stored at (or referenced by) the central monitoring application located at the solution manager server 210. The PI domain 205 may be defined based on relationships between various systems, and specifically based on the sending of messages between those systems.

In the illustrated example, various systems are illustrated, namely, a SOAP backend server 220, a JDBC database system 222, a JMS system 228, and a file system 234. These systems are each associated with adapter engines—adapter engine A 224 with the SOAP backend server 220 and the JDBC database system 222, adapter engine B 230 associated with the JMS system 228, and adapter engine C 236 associated with the file system 234. The relationships between these components are illustrated by the arrows 255. In some instances, the adapter engines may be located within the system they are associated with, while in others, the adapter engines may be located separately from those systems. For purposes of the illustration in FIG. 2, the adapter engines are illustrated separately from the associated systems for purposes of distinction. Further, the PI domain 205 is considered to include the adapter engines themselves, but not the associated systems. Each of the adapter engines are considered PI components within the PI domain 205 where messages, messaging information, and message metadata are stored and available for access.

The PI domain 205 also includes three ABAP proxies: ABAP proxy A 226, ABAP proxy B 232, and ABAP proxy C 238. In alternative implementations, one or more of the proxies may be Java-based proxies, as appropriate. The proxies may be used in association with a system to create XML-based (or other standard language or protocol) messages for sending among heterogeneous systems. The systems associated with the proxies in FIG. 2 are not illustrated, but may perform and send messages through the PI domain 205 similar to the systems associated with the adapter engines. As described above, the proxies, whether Java- or ABAP-based, as well as the adapter engines, are used to send and receive messages between heterogeneous systems in the illustrated environment 200. As illustrated, the adapter engines and proxies exchange messages with the integration server 215, which can interpret the messages to determine the location or entity to which the messages are to be delivered. The integration server 215 can modify the messages as needed, including translation and/or addressing (based on defined message mappings), prior to sending the messages on. Information regarding the messages being sent via the integration server 215 can be locally monitored, with the relevant information stored at the integration server 215 (or a communicably coupled location) for later use and analysis.

As illustrated by arrows 255, messages are sent between the various PI components (i.e., the adapter engines and proxies). Each of the messages illustrated in FIG. 2 are sent to the integration server 215, where those messages are relayed to the appropriate recipient. Although not illustrated, the adapter engines and proxies can send some or all of the messages directly to their respective recipients. Each of the PI components, as well as the integration server 215, can locally collect information and metadata associated with the information from the messages passing through or by the components, as well as copies of the messages and/or the messages' payload data. Users can access the information on a component-by-component basis to view or review the messages sent through the PI domain. However, as illustrated by the arrows 260, the solution manager server 210 can access each of the PI components and the sets of monitored information in order to pull that information into a single repository located at or accessible to the solution manager server 210 and its associated central monitoring application. Additionally, the solution manager server 210 can access local message stores associated with each PI component to access the actual messages themselves. In some instances, the solution manager server 210 can also access one or more message archives where archived messages associated with particular PI components are stored. The solution manager server 210 can access the information stored at (or associated with) the various PI components using APIs exposed by the PI components (or their associated systems) as described in FIG. 1A. The collected information can be aggregated and/or correlated in order to match outgoing messages from one system to incoming messages from another system. In some instances, the solution manager server 210 may perform various aggregation and correlation applications and functionality in order to match related messages. The solution manager server 210 can also use local functionality associated with each PI component (i.e., via one or more APIs) to use or request the execution of local search functionality of the respective PI component.

A group of related messages may be considered successful when the final message of the group leaves the PI domain 205. For example, a message may be sent from the JMS system 228 (via the adapter engine 230) to the file system 234 (via the adapter engine 236). Once the message is provided to the file system 234, which is considered external to the PI domain 205, the message may be considered a success. If no errors have been identified for a particular group of related messages, but the final message has not left the PI domain, the group of related messages may be considered "temporarily successful." Temporarily successful messages may represent messages that have not completed their processing and routing through the PI domain, as well as messages that are stalled at some point in their path but that have not yet been identified as "unsuccessful," or that have not yet resulted in an error or exception. In some instances, once "temporarily successful" groups of messages have exceeded a particular time period or threshold, they may be considered "unsuccessful," and the system may return an error. If an error has occurred and been identified for a particular group of related messages, those messages may be considered "unsuccessful."

As illustrated, the information stored at each individual component can be accessed and retrieved by the solution manager server 210 (illustrated by arrows 260). The solution manager server 210 may be associated with a plurality of PI domains other than the illustrated PI domain 205. In those instances, information about the other PI domains may be stored in the same or a different repository than the collected and retrieved information associated with the illustrated PI domain 205. When a technical user first accesses a monitoring application dashboard on the solution manager server 210 (i.e., associated with the central monitoring application 145 of FIG. 1A), the first action for the user may be to select a particular PI domain for viewing. The solution manager server 210 can then prepare a corresponding dashboard or other manner of presenting information specific to the selected PI domain. In this manner, the solution manager server 210 can be used in association with different PI domains and their associated components, including some PI domains where some physical components may be shared across the PI domains.

Additionally, FIG. 2 includes an integration directory 263, which may be similar to the integration directory 190 of FIG. 1. The integration directory 263 can be used to define one or more alert rules associated with one or more of the systems and adapter engines and/or ABAP proxies of the PI domain 205. Once an alert rule is initiated, the integration directory 190 can distribute the alert rules to the particular PI components associated with that alert rule to allow those components to evaluate the alert rules at runtime. Further, the integration directory 190 can allow systems to register for one or more of the alert rules. Upon registration, those systems receive information regarding which PI components (and corresponding systems) are involved in the messaging associated with the alert rule. Those systems can then monitor the set of PI components associated with the alert rule to determine if any alerts are triggered during runtime evaluation and are available for consumption and retrieval.

Figure 3:
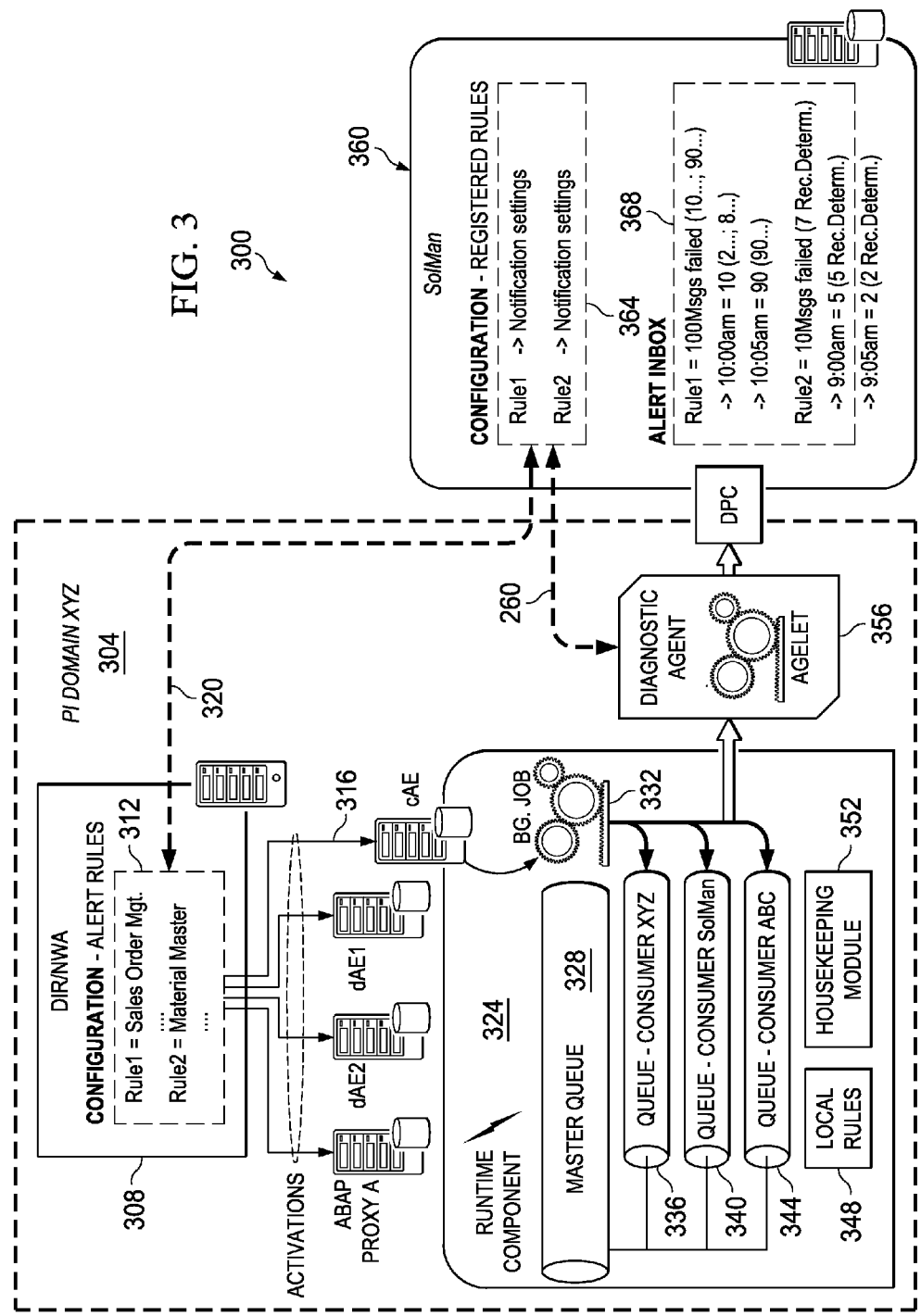
FIG. 3 illustrates a diagram of distributing centralized rules from an administrator and consuming message-based alerts by one or more registered consumers in an appropriate environment, such as the system described in FIG. 1A.

FIG. 3 illustrates a diagram of distributing centralized rules from an administrator (or integration directory) and consuming message-based alerts by one or more registered consumers in an appropriate environment, such as the system described in FIG. 1A. Some of the components illustrated in FIG. 3 may correspond with elements included in FIGS. 1A and 1B, while others may be portions or agents of those elements.

Specifically, FIG. 3 illustrates an example PI domain 304 where alert rules 312 are created and distributed to one or more PI runtime components (e.g., 324) associated with the alert rules, while one or more consumer systems, such as a solution manager 360, can register to monitor at least one alert rule 312 and consume the results directly from the PI runtime components where the created alert rules have been distributed and where those alert rules are evaluated as messages are received.

The alert rules 312 are initially defined at a configuration system, such as a networked administration system or an integration directory 308 (e.g., integration directory 190 of FIG. 1). The alert rules 312 define a set of alert criteria to be used to determine whether an alert associated with messages passed to particular PI components experience issues or errors meeting the criteria of the alert rules. In addition to the alert criteria, the alert rules 312 may define the particular PI components with which they are related. In some instances, the alert rules 312 may be distributed to each of the PI components within the PI domain 304, while in other instances, individual alert rules 312 may only be distributed to the particular PI components that are directly associated with that individual alert rule 312. Arrow 316 illustrates the integration directory 308 distributing the alert rules 312 to the appropriate PI components. Additional arrows from the integration directory 308 show the distribution of alert rules 312 to other PI components.

The PI component 324 receives one or more alert rules 312 from the integration directory 308, and can store them locally (i.e., local rules 348) for later processing. During runtime operations, one or more messages are passed between the various PI components, as described in FIG. 2. As messages are received at the PI component 324, a determination may be made as to whether any of those messages meet or satisfy a particular alert rule 348 that is evaluated at the PI component 324. When a message meets or satisfies a particular alert rule 348, those messages can be placed in a master queue 328. A background job 332 (or any other suitable module, agent, program, etc.) executing at the PI component can evaluate the messages placed into the master queue 328, and place copies of those messages and any related alert into one or more of the message sub-queues 336, 340, 344.

Message sub-queues, in general, can be created at the PI component 324 in response to receiving a notice of one or more consumer systems registering to consume a particular alert rule 312. As illustrated by line 320, the solution manager 360 may be a consumer system, and can register with the integration directory 308 to retrieve one or more of the alert rules 312. When a consumer registers for an alert rule 312, the integration directory 308 can notify the affected PI components 324 of the registration (as also shown via line 316) of the registration. Upon notification, the affected PI components 324 can create message sub-queues to be used by the registering system. As illustrated in FIG. 3, message sub-queues 336, 340, 344 have been generated for three consuming systems, Consumer XYZ, Solution Manager 360, and Consumer ABC, respectively. The background job 332, as mentioned above, can monitor the alert messages and events collected in the master queue 328 and determine one or more sub-queues associated with particular items in the master queue 328. Those items can then be copied into the appropriate sub-queue for later collection. In some instances, once a message is evaluated in the master queue 328 by the background job 332, the message can be deleted or moved to an appropriate archive (not shown) where the alert message may be archived.

As illustrated, the PI component 324 includes a housekeeping module 352. The housekeeping module 352 can assist in removing consumed alert messages from the local stores as those locations fill with a large number of events and messages, and to avoid queue overflows. The housekeeping module 352 can perform a housekeeping check after a predefined number N of events (which may be called, e.g., a "chunk"). The time T in which the chunk of messages/events is received is measured. If the time of two consecutive chunks is too short (i.e., below a predetermined threshold), the PI component 324 may switch to an emergency mode. An emergency mode may mean that no single events are placed into the queue, but only a general emergency message at the end of each chunk is written into the log, detailing that on the particular system a certain number of events N occurred in a certain amount of time T. The values of N and T can be dynamically determined based on the available system resources and/or user or administrative settings (e.g., memory, storage space, settings, etc.). If for two consecutive chunks the sending time is again above the threshold T (or the threshold T is reached before the end of a chunk), normal mode may be switched on again, allowing each event to be placed into the queue.

Additionally, the housekeeping module 352 may assist in aggregating one or more alert messages or events if those events have not been processed by a potential consumer in a predetermined time threshold. If a consumer is slow or not available, or if too many alert-related events are created (e.g., based on significant issues in the system, or based on many active alert rules matching many alert events), the queues may quickly overflow. To address this issue, the housekeeping module 352 may be used to save the already evaluated results as much as possible. For instance, after a chunk of size N is complete, the age of the first entry $T_{first}$ in the queue is determined. If $T_{first}$ is older than a certain age (i.e., if $T_{first} > T_{max}$, where $T_{max}$ is the maximum allowed age of an entry), then the content of the queue can be read and aggregated for each consumer into one or several aggregated alert messages or events, which can combine at least a subset of the information stored in the to-be aggregated entries of the respective queue. The aggregated alert messages can be consumed similar to the individual messages by the consumers. The content that is aggregated can then be deleted from respective queues, and replaced by the aggregated alert message.

As illustrated, a diagnostic agent 356 can monitor the various queues to determine when alerts relevant to a particular consumer are added to a sub-queue, after which the relevant alerts can be retrieved and added to the consumer's systems (i.e., their alert inbox 368). The diagnostic agent 356 may be any program, agent, module, or other software capable of monitoring a particular queue. In some instances, a diagnostic agent 356 may monitor one or more sub-queues for a single consumer or, alternatively, for several different consumers. In some instances, multiple diagnostic agents 356 or similar software may be used in a single PI domain. The diagnostic agent 356 may monitor a single PI component or multiple PI components, as appropriate, and may be located external from or internal to a particular PI component. In many cases, the diagnostic agent 356 may be managed or controlled by its associated consumer system.

The solution manager 360 may be similar to the solution manager server 141 described in FIG. 1A. In the present illustration, the solution manager 360 includes a configuration of registered rules 364 and an alert inbox 368. The configuration 364 stores information associated with the one or more alert rules for which the solution manager 360 is registered. This configuration 364 can be used to determine one or more PI components for which to assign diagnostic agents 356 associated with the solution manager 360). The alert inbox 368 of the solution manager 360 can be used to store, analyze, and interpret the various collected alert events and messages from the PI components associated with the alert rules for which the solution manager 360 is registered. Those results can be presented in various dashboards, UIs, and other presentations associated with the alert inbox 358.

Figure 4:
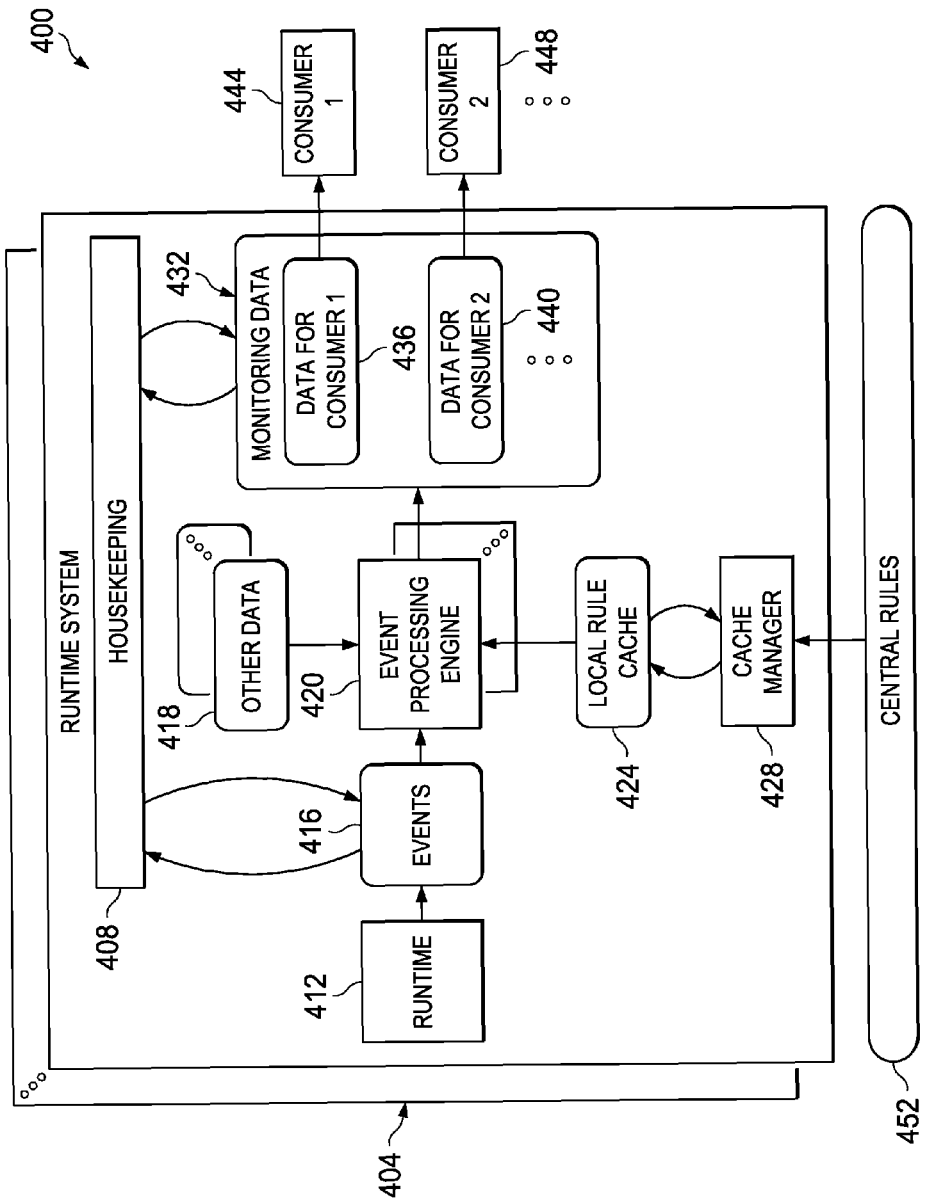
FIG. 4 illustrates a diagram of a particular runtime component or system from a local point of view.

FIG. 4 illustrates a building block diagram 400 of one implementation of the present application. Some components are similar to those of FIGS. 1A, 1B, and 3, while others are different. In some instances, the elements described in FIG. 4 may represent one or more of the components illustrated in FIGS. 1A, 1B, and 3, or a portion of one of those components. In other instances, the elements of FIG. 4 may be different.

The message processing runtime 412 processes the messages sent and received at the PI component 404 and raises the alert-related events, which are relevant for monitoring. These alert events are stored into an event store 416, which typically is a queue. The event processing engine 420, which can run in several parallel processes depending on the amount of events to be processed, fetches the events from this event store 416 and evaluates the alert rules associated with each event. The centrally configured rules 452 (possibly defined at an integration directory or central configuration system) are cached locally (in the local rule cache 424) to improve the performance of the rule access. Depending on the result of the evaluation, events will be put into the monitoring data store 432 and its respective sub-queues 436, 440 for all registered consumers 444, 448. There, the event can be converted to a consumer-specific format and enriched with other data 424, as is suitable. From the monitoring data store 432, the consumers 444, 448 can read and/or retrieve their data without influencing the other consumers 444, 448 and affecting any queue other than that associated with the particular consumer associated with that particular sub-queue. For more complex scenarios, the consumer itself can be another event processing engine which, for instance, can aggregate the data, correlate events and messages, and perform other high-level functions. The event processing operations can be repeated multiple times, as necessary. In some instances, one event can be placed in two or more sub-queues (e.g., 436 and 440) if the associated alert rules and registered consumers require it.

Figure 5B:
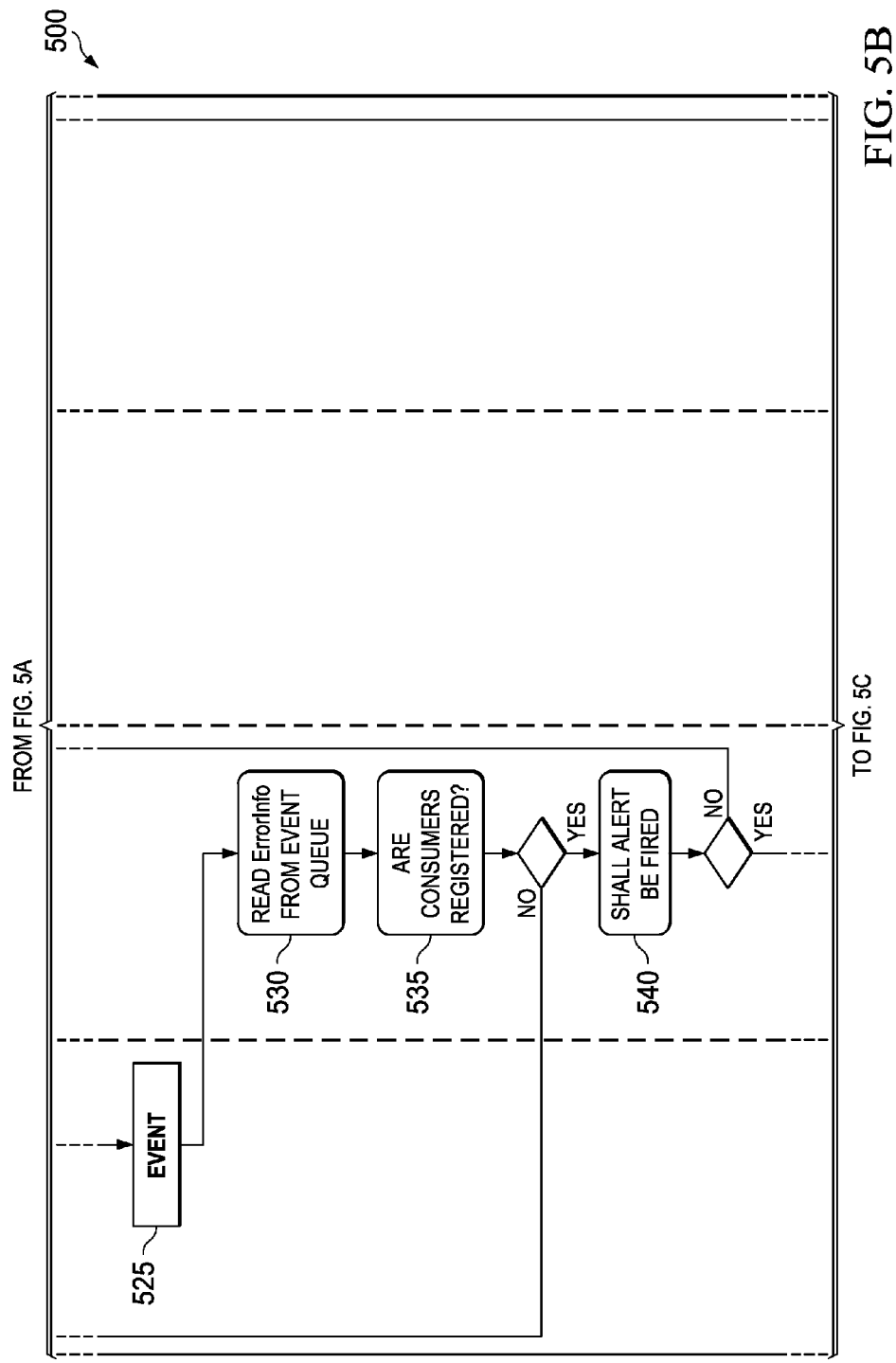
FIG. 5 is a swim lane diagram illustrated an example inter-component process for handling, collecting, and processing events and alerts associated with message coordination and evaluation.
Figure 5C:
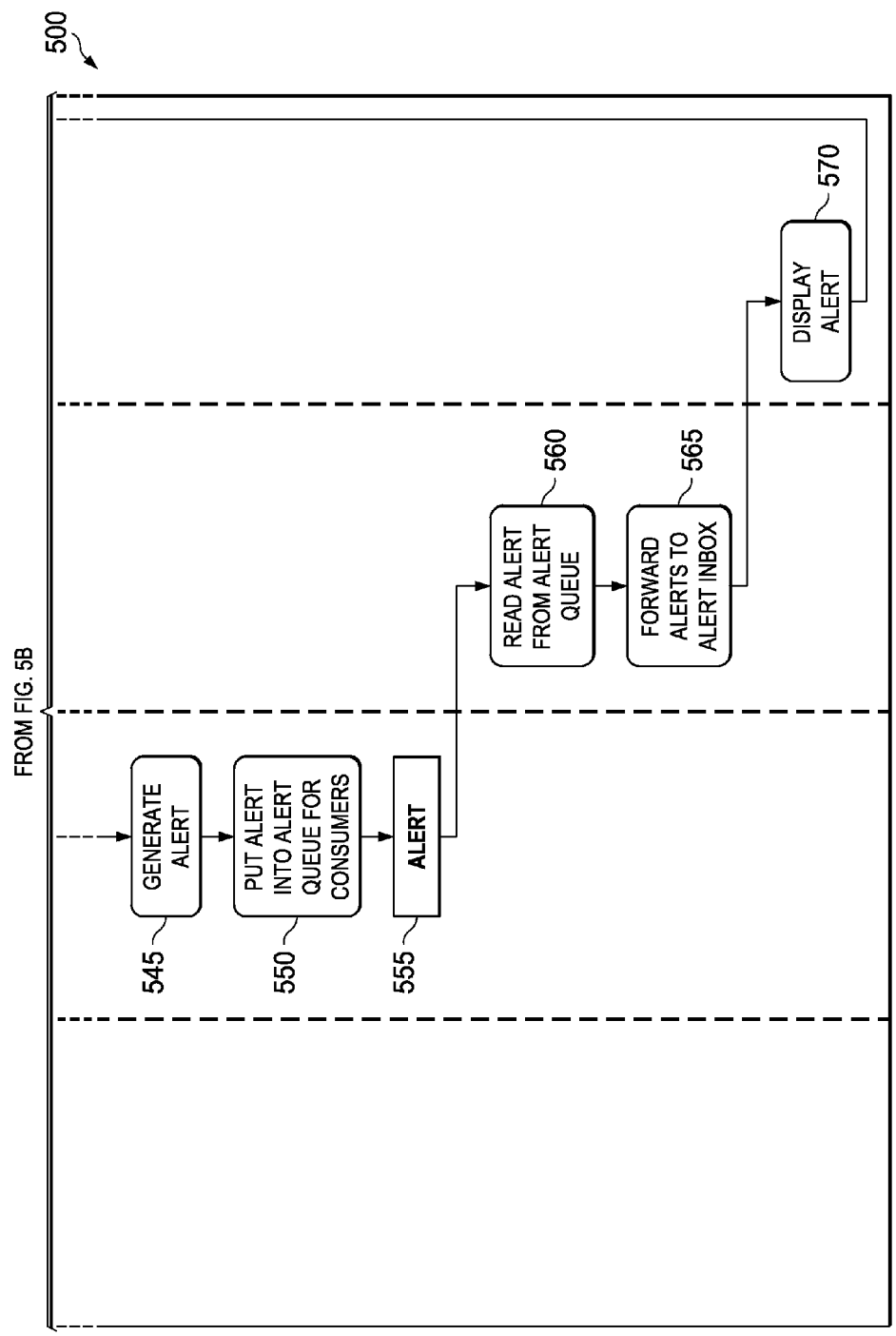

FIG. 5 is a swim lane diagram 500 illustrated an example inter-component process for handling, collecting, and processing events and alerts associated with message coordination and evaluation. As illustrated, the swim lanes relate to a runtime component 504, a local alert engine 506, an alert consumer 508, and an alert inbox 510 of the alert consumer 508. The runtime component 504 can perform the standard operations of any suitable runtime component, including processing messages as they are received, and identifying any errors occurring during those processing operations. The local alert engine 506 may be a part of the runtime component 504, or an addition component at the system associated with runtime component 504 where one or more rule alerts associated with the runtime component 504 and its associated messaging interactions are evaluated. The alert consumer 508 may be an actual system previously registered to consume a particular alert rule, or an agent or portion of that system. The alert inbox 510 may be a message collection and presentation module or agent associated with the alert consumer 508.

Initially, the runtime component 504 can perform its normal operations. At 515, a determination as to whether an error has occurred in association with a particular message or message interaction is determined. If no error occurs, the runtime component 504 can continue its operations. If, however, an error is identified, at 520 a set of error information (and, in some cases, the message itself) is placed into an event queue associated with the runtime component 504, and an event may be defined at 525.

At 530, the local alert engine 506 can read the error information from the event queue, particularly in light of the one or more alert rules associated with the runtime component 504. At 535, a determination is made as to whether any alert consumers are registered with the particular alert rule or rules that may be associated with the particular error information. As previously described, two or more alert rules may be triggered by one set of error information in the event queue. If no alert consumers are registered for the alert rule(s) associated with the error in the event queue, then the runtime component 504 can return to normal processing, as no alerts may be generated. Alternatively, an alert may be generated, but the alert will not be placed in an alert consumer-specific messaging queue.

At 540, a determination as to whether an alert will be fired, or generated, is determined based on the contents of the event error information in light of the one or more alert rules associated with the runtime component 504. The local alert engine 506 can perform the evaluation. If no alerts are to be generated, the runtime component 504 can return to its normal operations. If an alert rule is to be generated, however, then at 545 the local alert engine 506 can generate a suitable alert for inclusion in the general alert or message queue. At 550, the generated alert can further be placed into an alert queue associated with one or more particular alert consumers 508, such as an alert consumer-related sub-queue. At 555, the generated alert is available for collection by the various alert consumers 508.

At 560, the alert in the corresponding alert consumer-related alert queue (or sub-queue), can be read and/or retrieved by the corresponding alert consumer 508. The alert consumer 508 can use various suitable agents, modules, programs, daemons, and other software to monitor specific sub-queues to determine if new alert information is available, as well as to collect the alert message information when indication of an available set of alert information is identified. At 560, the alert consumer 508 can forward, at 565, the collected alerts to the alert inbox 510, as appropriate. At 570, the alert inbox 510 associated with the particular alert consumer 508 can be used to process the alert information, generate related analyses, and display information associated with the alert (e.g., via one or more suitable dashboards or other UIs).

Figures 6, 7:
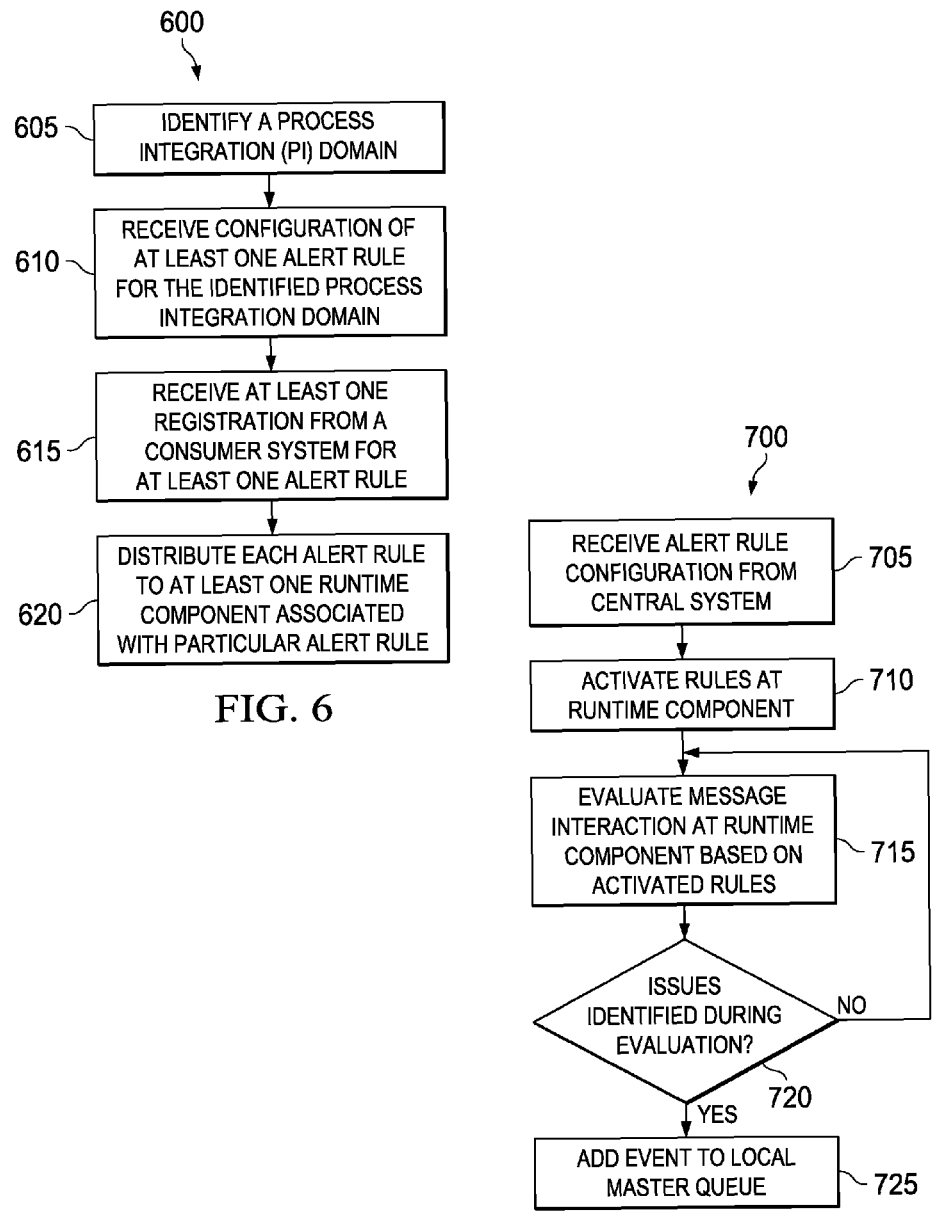
FIG. 6 is a flowchart of an example process for configuring alert rules and messages at a centralized location in an appropriate environment, such as the system described in FIG. 1A.
FIG. 7 is a flowchart of an example process for activating and evaluating local alert rules at a local runtime component in an appropriate environment, such as the system described in FIG. 1A.

FIG. 6 is a flowchart of an example process 600 for configuring alert rules and messages at a centralized location in an appropriate environment, such as the system described in FIG. 1A. For clarity of presentation, the description that follows generally describes method 600 in the context of environment 100 illustrated in FIG. 1A. However, it will be understood that method 600 may be performed, for example, by any other suitable system, environment, or combination of systems and environments, as appropriate. In general, method 600 describes the initial setup of a particular alert rule at a centralized system or location, where one or more of the configured alert rules can be defined, one or more alert consumers can register for one or more of the rules, and the rules can be distributed appropriately throughout the system.

At 605, a particular PI domain of interest can be identified. In some instances, multiple PI domains may available for identification, such as where various PI domains have been defined for various operations, networks, and communications.

At 610, configuration information associated with at least one alert rule for the identified PI domain is received. The configuration information can, in some instances, be received via a rule definition and configuration UI, dashboard, wizard, or other suitable interface. In some instances, an alert rule identified for another PI domain may be migrated or copied over from that other PI domain for use in the identified PI domain. In some instances, the migrated or copied alert rule can then be modified for use in the identified PI domain.

At 615, at least one registration from one or more alert consumer systems is received, identifying the at least one alert consumer system as a consumer of information relating to a particular alert rule. The alert consumer system can register with a central system to ensure that messages and alerts associated with the alert rule are made available to the alert consumer system. In some instances, in response to receiving the at least one registration, the centralized system may provide information regarding the alert rule to the alert consumer system, including information on one or more systems at which information associated with the alert rule may be made available. The alert consumer system can then monitor those systems to identify and collect alert rule-relevant information from the corresponding PI component(s) associated with the alert rule for further processing.

At 620, the configured alert rules can be distributed to at least one runtime component associated with the particular alert rule. For example, if the alert rule relates to a message choreography or exchange between systems A and B, the alert rule criteria associated with those rules can be distributed directly to an alert engine or store associated at each of system A and system B, allowing those systems to evaluate messages exchanged and errors occurring at those particular systems. The rules can be evaluated by those systems, with information satisfying the alert rules turned into a corresponding alert. In some instances, alert rules may not be distributed until they are specifically activated. Additionally, in alternative instances, the alert rules may be distributed to all systems in a particular PI domain, not just those systems specifically associated with the alert rules.

FIG. 7 is a flowchart of an example process 700 for activating and evaluating local alert rules at a local runtime component in an appropriate environment, such as the system described in FIG. 1A. For clarity of presentation, the description that follows generally describes method 700 in the context of environment 100 illustrated in FIG. 1A. However, it will be understood that method 700 may be performed, for example, by any other suitable system, environment, or combination of systems and environments, as appropriate. In general, method 700 describes the activation and evaluation of specific alert rules locally at a PI runtime component and its associated system after receiving the alert rule from a central rules system.

At 705, a specific alert rule configuration is received from a central system where alert rules are created and defined. The received alert configuration may be a specific set of alert rule criteria to be evaluated when alerts and errors occur at the local runtime component. The configuration may also include information on which alert consumer systems may have registered for the alert rule, in some instances.

At 710, the received alert rules associated with the received alert configuration may be activated, so that those alert rules can be properly evaluated at the local component. In some instances, the received alert rules may be activated upon receipt from the central system, while in other instances, the alert rules may be activated by a second notification from the central system, such as when one or more alert consumer systems register to consume the alert rule.

At 715, the message interactions and operations can be evaluated at the runtime component based upon the one or more activated rules to determine if one or more of the alert rules are satisfied. In some instances, similar evaluations can be performed in parallel for a plurality of message interactions and operations occurring at the runtime component. At 720, a determination is made as to whether one or more alert rules were satisfied during the evaluation of 715. If not, method 700 returns to 715 for further evaluation. If so, then information associated with the at least one alert rule and the associated message and its current status, along with any other suitable alert information, can be added to the local master queue at 725. The master queue can store a plurality of alert-related events and associated data, as needed.

Figure 8:
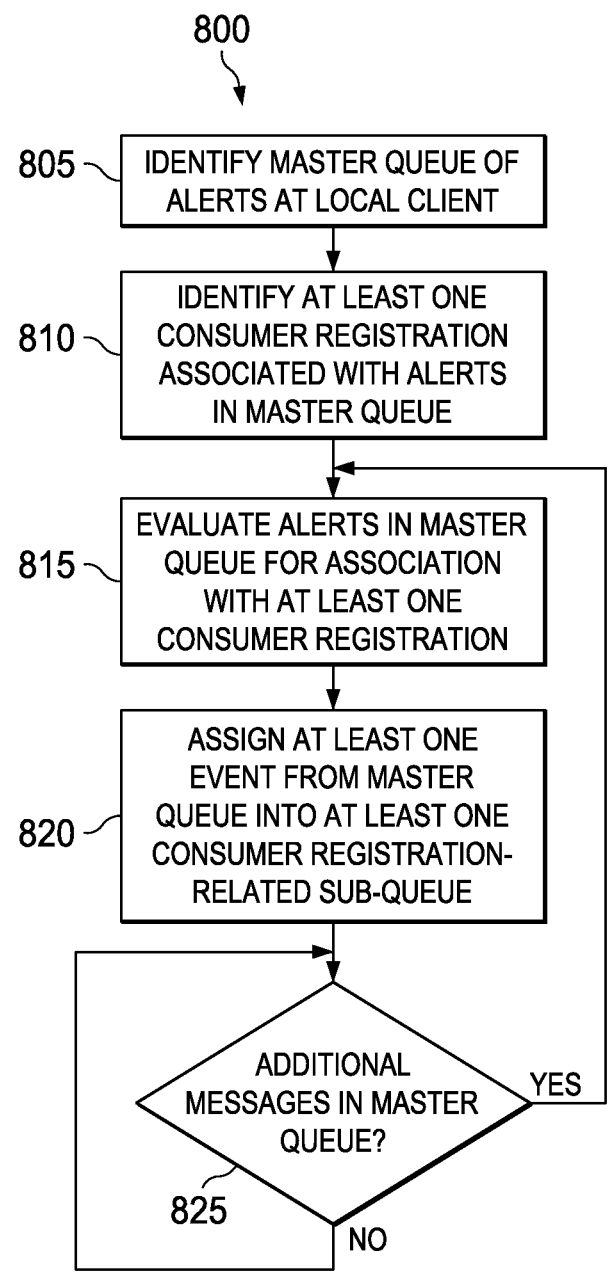
FIG. 8 is a flowchart of an example process for assigning identified alerts from a master queue to one or more sub-queues associated with specific consumers.

FIG. 8 is a flowchart of an example process 800 for assigning one or more alerts from a master queue to one or more sub-queues associated with specific alert consumers. For clarity of presentation, the description that follows generally describes method 800 in the context of environment 100 illustrated in FIG. 1A. However, it will be understood that method 800 may be performed, for example, by any other suitable system, environment, or combination of systems and environments, as appropriate.

At 805, a master queue storing alerts at a local runtime component is identified. The master queue can be the initial storage location for any generated alerts and alert events in response to issues with messages and message interactions identified based on the evaluation of the alert rules at the runtime component. The master queue can be used as a staging point where alert events are stored prior to providing (or making available) those alert rules to specific alert consumers.

At 810, at least one consumer registration associated with the alerts in the master queue, and specific alert rules in general, can be identified. As previously discussed, alert consumers can register to follow and collect information associated with various alert rules from the central system, and can then monitor the local runtime components for new alert events and messages associated with those alert rules. The local runtime components can also receive information on which alert consumers are registered to specific alert rules. Using that information, the local runtime components can create and use sub-queues specific to particular alert consumers, moving alert messages and alert events in the master queue to the sub-queues, as appropriate, upon further review.

Specifically, the alert messages and events in the master queue can be evaluated at 815 to determine their relevance to one or more of the alert consumer registrations. At 820, at least one event from the master queue can then be assigned to at least one consumer registration-related sub-queue, as described above. A single message or event from the master queue can be moved to two or more alert consumer sub-queues, as needed. Further, upon moving the message or event out of the master queue, the corresponding message and event can be deleted from the master queue to keep the size of the master queue at a reasonable and manageable size.

At 825, a determination is made as to whether additional messages remain in the master queue. If no additional messages remain, then method 800 waits until new messages are received. If additional messages do remain in the master queue, then method 800 returns to 815 to evaluate those alert messages and events for relation to at least one alert consumer.

Figure 9:
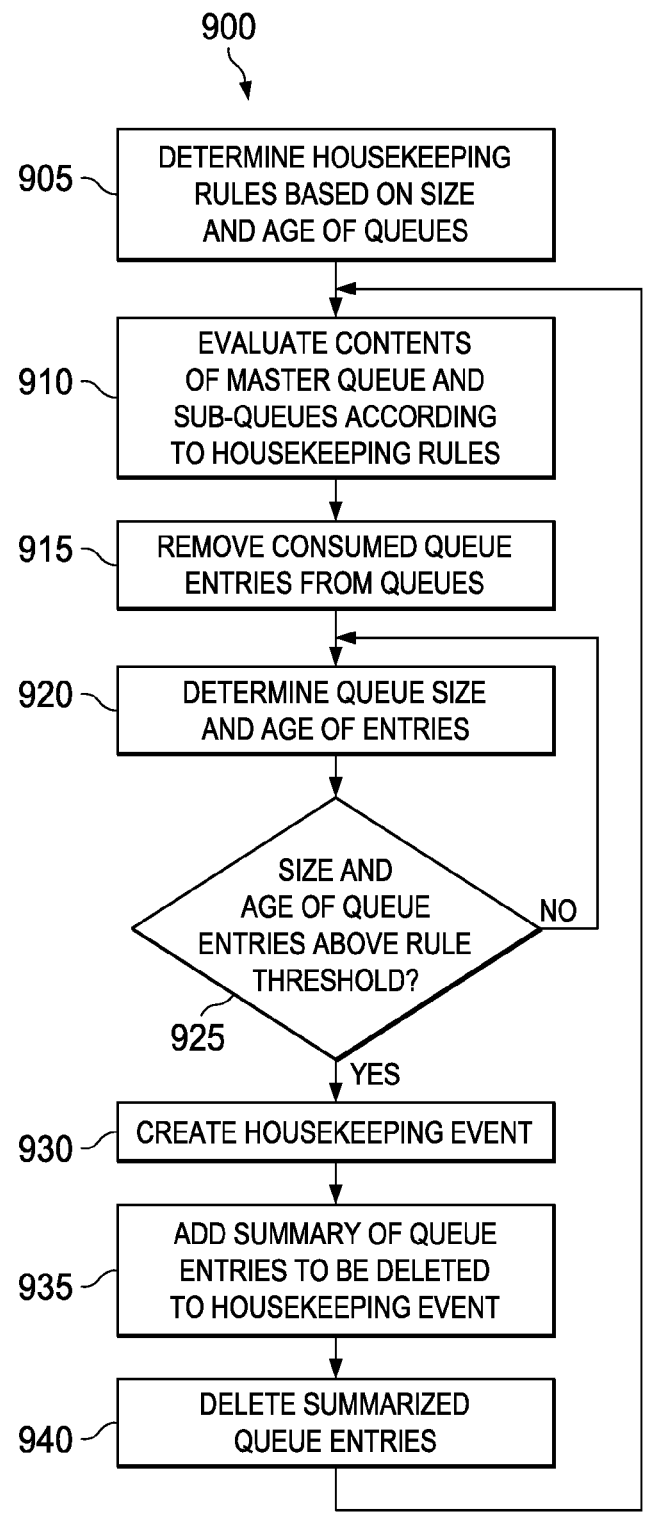
FIG. 9 is a flowchart of an example process for managing master and sub-queues in response to limitations on queue sizes and the ages of entries within the queue.

FIG. 9 is a flowchart of an example process 900 for managing master and sub-queues in response to limitations on queue sizes and the ages of entries within the queue. For clarity of presentation, the description that follows generally describes method 900 in the context of environment 100 illustrated in FIG. 1A. However, it will be understood that method 900 may be performed, for example, by any other suitable system, environment, or combination of systems and environments, as appropriate.

At 905, a set of housekeeping rules are determined and/or identified, where the housekeeping rules describe one or more rules for maintaining the size and relative age of entries in a particular master queue or sub-queue associated with a particular runtime component. The size of the queue and the age of particular entries in the queue, as well as other suitable factors, can be used to identify one or more entries to be removed and/or aggregated in order to avoid performance issues before they occur. In some instances, a particular housekeeping rule may keep an older alert entry where the corresponding queue is relatively empty, or where the queue has substantial space for additional entries. Also, a relatively newer entry may be deleted or aggregated where the queue is relatively full, and may need additional space to store incoming alert information and entries.

At 910, the contents of the master queue and sub-queues are evaluated based on the identified housekeeping rules. First, at 915, consumed queue entries may be removed from specific queues. For example, if the entries from a particular sub-queue have been retrieved by the corresponding alert consumer, those entries, if not deleted upon retrieval, can be removed and/or archived, as appropriate. In some instances, entries in the master queue may also be removed. For example, if the entries have been evaluated for each potential alert consumer, and have been moved/copied to the appropriate location, then the entries may be removed and/or archived.

At 920, the remaining contents of a particular queue may be evaluated, and in particular, their relative size and age of the entries. A determination may be made at 925, as to whether the size of the queue and the age of the one or more queue entries satisfies or exceeds a particular threshold or dynamic determination from the housekeeping rules. This may occur where entries are not deleted immediately upon retrieval, or where the threshold is reached or housekeeping rule is satisfied before the entries are collected. If the rules are not met, method 900 returns to 920. If, however, the rules are met, method 900 continues at 930. At 930, a housekeeping event can be created, where the housekeeping event can collect and aggregate the information included within the alert messages within the specific queue, collecting a subset of the data and information of the entries remaining when the housekeeping event is to be created. In some instances, only the oldest entries may be added to the housekeeping event, while the newer entries are kept until a later time. This can be determined on the particular housekeeping rules, as well as the dynamic status of the respective queue. Example rules are described above, in relation to FIG. 3.

At 935, the summary of the aggregated entries can be added to the housekeeping event, with the summaries containing a subset of the information included in the aggregated entries. The housekeeping event can remain in the queue and can be used by the alert consumers in lieu of the individual messages and events. Once the housekeeping event is populated, the queue entries included in the housekeeping event can be deleted at 940.

Figure 10A:
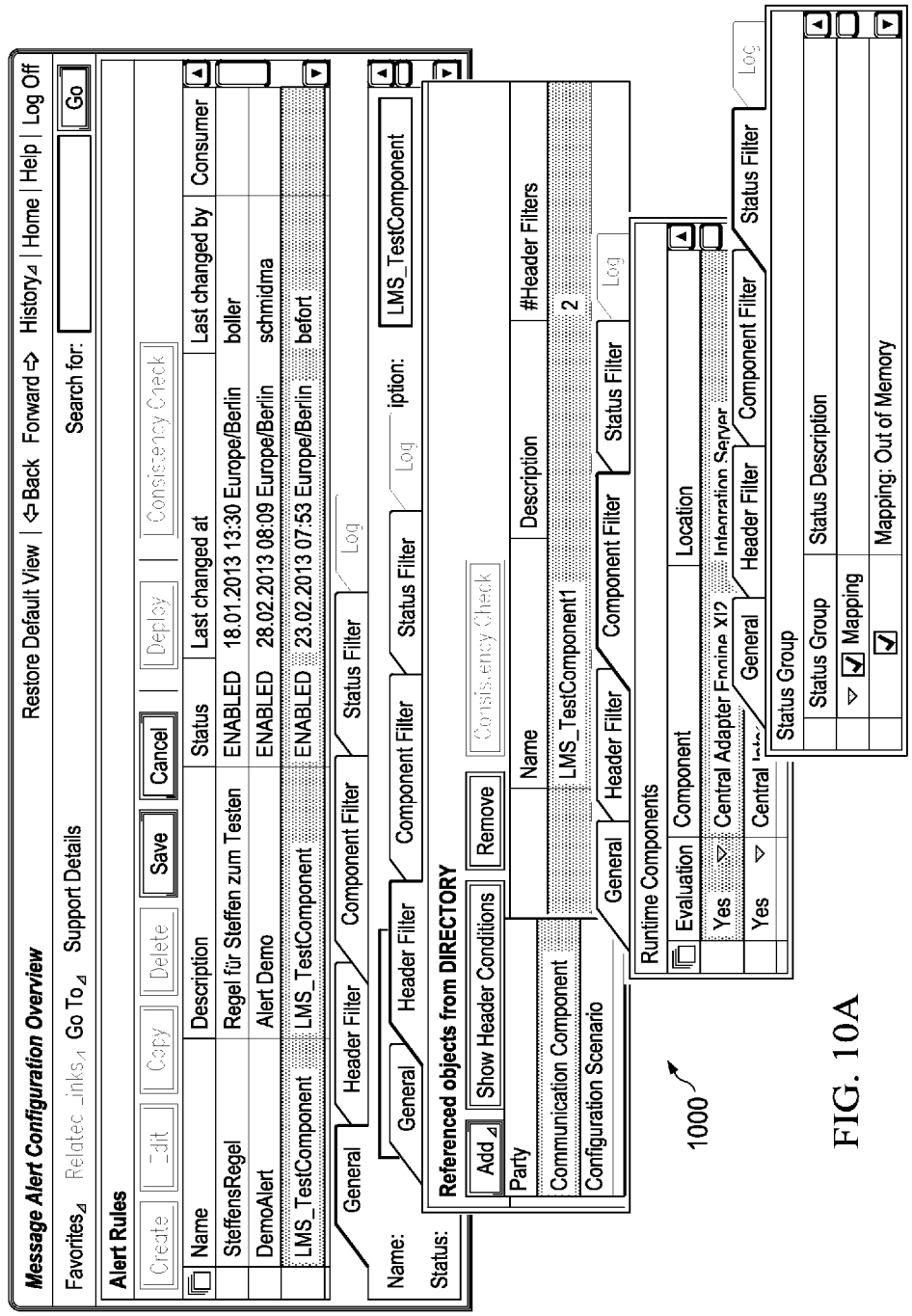
Figure 10B:
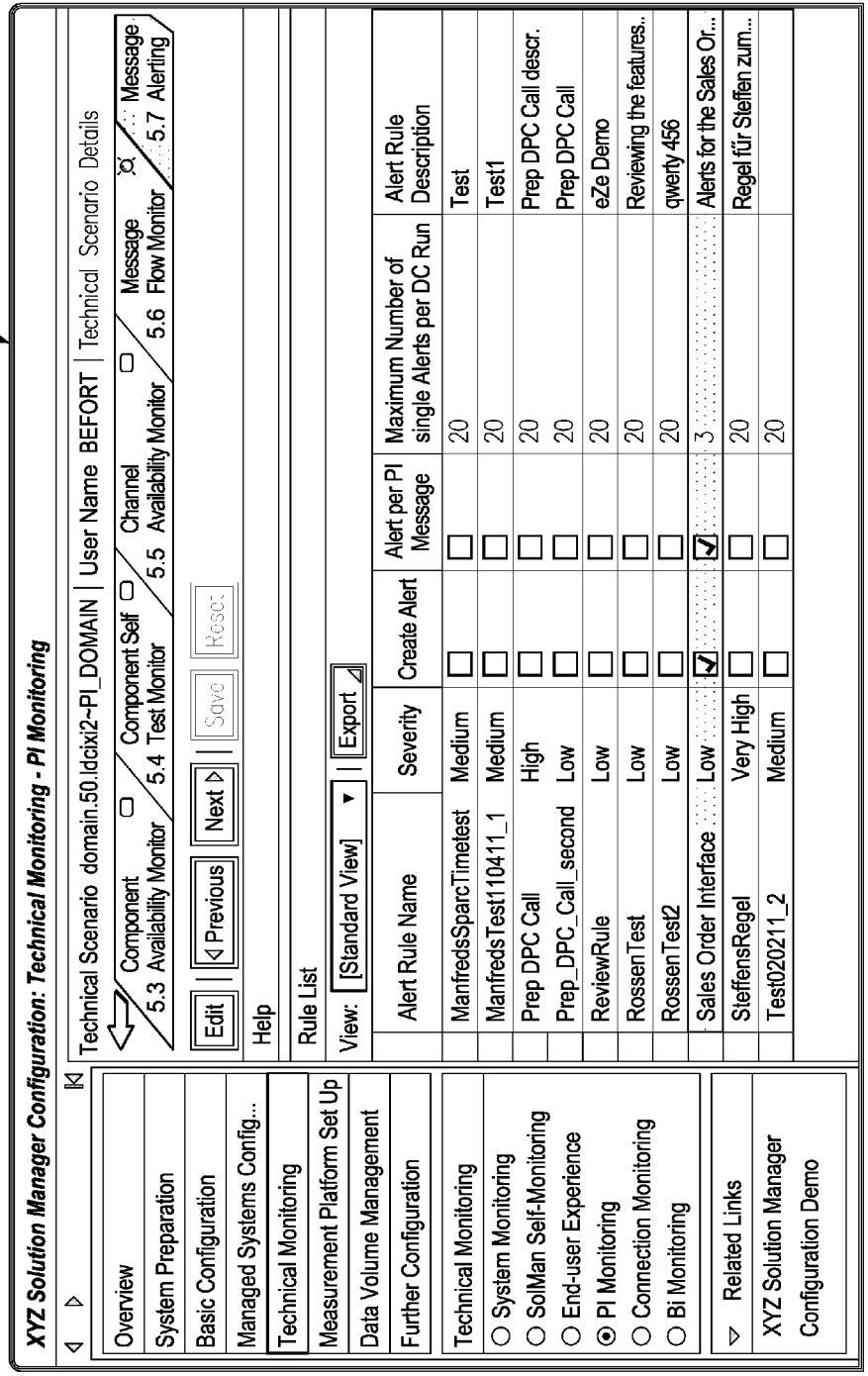
Figure 10D:
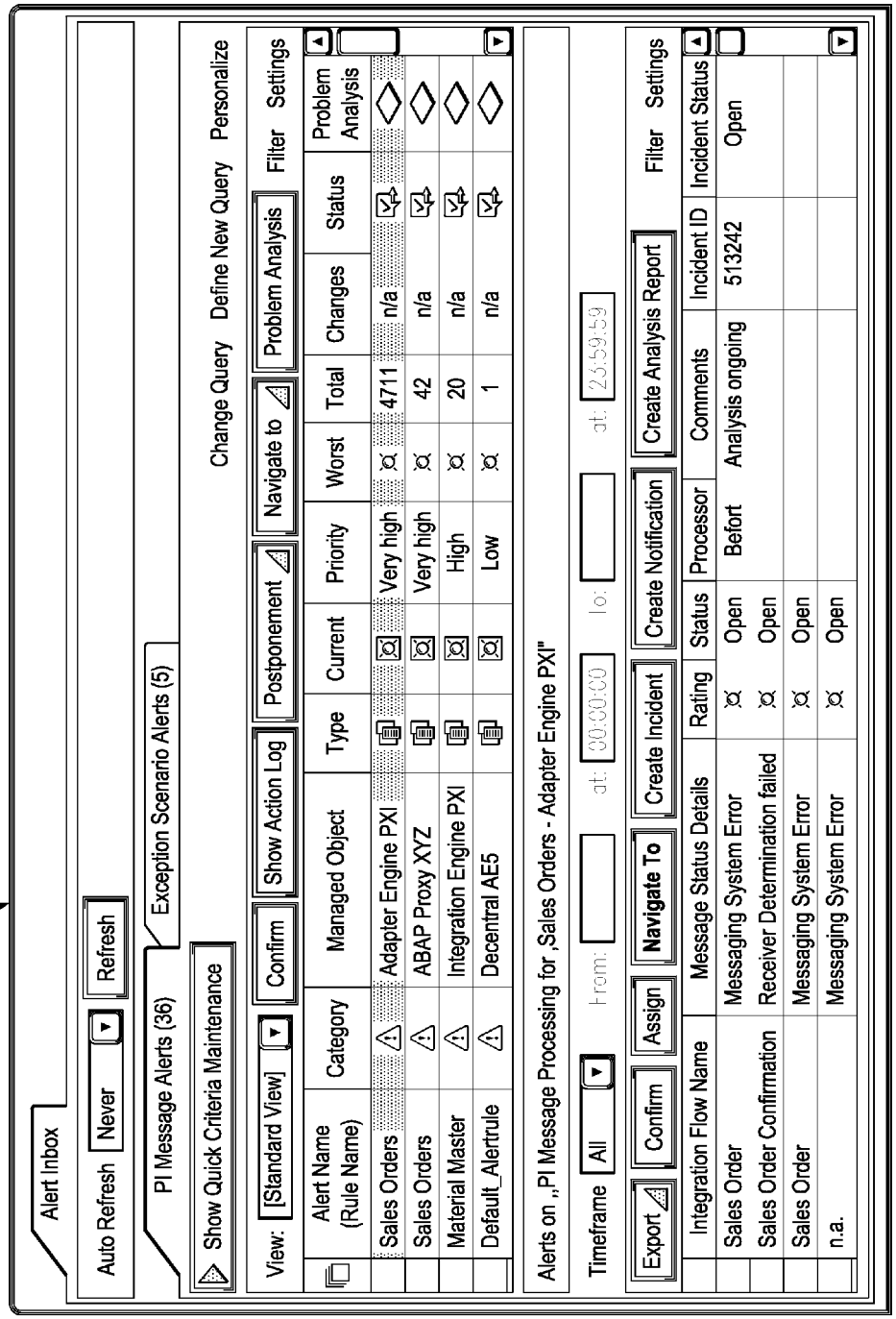

FIGS. 10A-E are example screenshots of various dashboards and interactions provided through use of an appropriate system, such as the system described in FIG. 1A. FIG. 10A, for example, illustrates a set of windows 1000 associated with a configuration of one or more alert rules in the central configuration system, such as the integration directory 190 of FIG. 1A. A new rule can be created, one or more PI runtime components can be associated with the rule, and one or more status details and/or alerting events can be defined. Using this combination, the specific alert rule can be created and saved.

FIG. 10B illustrates an interface used by an alert consumer (as illustrated, the solution manager system 141) to configure one or more alert rules for registration and consuming. A list of available rules is presented via the dashboard 1015, and the administrator or user associated with the alert consumer can select, via a check box, the particular alerts to create, as well as additional options, as needed (here, a decision to send a single alert per message). Additional and alternative options may be included in alternative implementations.

FIG. 10C illustrates an alert inbox dashboard 1030, where the alert inbox provides information on various alerts triggered for each registered alert rule. By selecting a particular alert rule from an alert rule display 1032, a second display 1034 can provide information and timing on each alert event and messages associated with that rule. The alert inbox dashboard 1030 can provide detailed alert information to users of alert consumers.

FIG. 10D provides an alternative view of an alert inbox dashboard 1045. In this illustration, additional information and actions associated with the alerts can be performed, including acting upon alerts, navigating to a particular system's information based on issues identified at that system, performing a problem analysis, or requesting creation of an analysis report. Additional relevant actions can also be performed. Still further, listings of aggregated message alerts can be provided to illustrate similar error types and actions, and can provide users with a quick and efficient view of the current PI domain.

FIG. 10E provides an illustration of an alert email 1060 that can be generated from one of the previous alert inbox dashboards 1030, 1045. The information can provide a list of messages and information regarding the alert, and can be generated and, in some cases, sent directly from the corresponding dashboard. Relevant alert-related information can be provided in a particular format (e.g., text, XML, etc.) and delivered to an appropriate person or destination. The simple sharing of information allows the dashboards to function as a single location for problem solution and technical assistance.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for centralized management of alert rules, the method comprising:
   identifying at least one alert rule at a central rules repository, the at least one alert rule associated with at least one message inter-communication within a process integration (PI) domain, wherein the PI domain includes at least one PI component, wherein the message inter-communications within the PI domain occur between PI components, wherein the at least one PI component contains a generic queue and one or more associated sub-queues generated based on at least one
   identified at least one remote alert consumer registration associated with at least one remote alert consumer system for at least one of the identified alert rules at the central rules repository, wherein the generic queue and the at least one sub-queue are analyzed with a housekeeping algorithm using one or more housekeeping rules to maintain a size and age of the respective queues, where the housekeeping algorithm includes a determination of the size of the respective queues and the age of the at least one alert event included therein, and wherein the housekeeping algorithm creates a housekeeping event once a threshold determined from the one or more housekeeping rules is exceeded, the housekeeping event collecting and aggregating a subset of data and information included within alert messages remaining within a specific queue when the housekeeping event is created; and
   distributing information associated with the at least one identified alert rule from the central rules repository to the at least one PI component associated with the at least one message inter-communication associated with the at least one alert rule and to the at least one alert consumer system associated with the identified at least one alert consumer registration, wherein the information includes information on one or more other alert consumer systems at which information associated with the at least one identified alert rule is made available, and wherein the one or more other alert consumer systems are monitored to identify and collect alert rule-relevant information associated with the at least one identified alert rule for further processing.

2. The method of claim 1, wherein the distributed information associated with the at least one alert rule from the central rules repository comprises a first set of distributed information distributed to the at least one PI component associated with the at least one message inter-communication and a second set of distributed information distributed to the at least one alert consumer system associated with the identified at least one alert consumer registration.

3. The method of claim 1, wherein in response to receiving the information associated with the at least one alert rule from the central rules repository, each of the at least one PI components associated with the at least one message inter-communication associated with the at least one alert rule evaluates the messages associated with a particular PI component based upon the at least one alert rule.

4. The method of claim 3, wherein an alert event is generated at the particular PI component in response to a message satisfying the at least one alert rule.

5. The method of claim 4, wherein the alert events are initially stored in the generic queue at the particular PI component.

6. The method of claim 5, wherein the particular PI component associated with a particular alert rule receives, from the central rules repository, information identifying the at least one alert consumer registration associated with the particular alert rule; and further wherein, the particular PI component creates a sub-queue of the one or more associated sub-queues, the sub-queue specific to the at least one identified alert consumer registration.

7. The method of claim 6, further comprising:
   analyzing the generic queue at the particular PI component to identify at least one alert event associated with the at least one alert consumer registration; and
   moving a copy of the at least one identified alert event to the sub-queue specific to the at least one identified alert consumer registration.

8. The method of claim 7, wherein the at least one alert event is associated with at least two different alert consumer registrations wherein a copy of the at least one identified alert event is moved to at least two different sub-queues.

9. The method of claim 7, wherein the at least one identified alert event is removed from the generic queue after moving the copy of the at least one identified alert event.

10. A computer program product encoded on a non-transitory, tangible storage medium, the product comprising computer readable instructions for causing one or more processors to perform operations comprising:
   identifying at least one alert rule at a central rules repository, the at least one alert rule associated with at least one message inter-communication within a process integration (PI) domain, wherein the PI domain includes at least one PI component, wherein the message inter-communications within the PI domain occur between PI components, wherein the at least one PI component contains a generic queue and one or more associated sub-queues generated based on at least one
   identified at least one alert consumer registration associated with at least one remote alert consumer system for at least one of the identified alert rules at the central rules repository, wherein the generic queue and the at least one sub-queue are analyzed with a housekeeping algorithm using one or more housekeeping rules to maintain a size and age of the respective queues, where the housekeeping algorithm includes a determination of the size of the respective queues and the age of the at least one alert event included therein, and wherein the housekeeping algorithm creates a housekeeping event once a threshold determined from the one or more housekeeping rules is exceeded, the housekeeping event collecting and aggregating a subset of data and information included within alert messages remaining within a specific queue when the housekeeping event is created; and
   distributing information associated with the at least one identified alert rule from the central rules repository to the at least one PI component associated with the at least one message inter-communication associated with the at least one alert rule and to the at least one alert consumer system associated with the identified at least one alert consumer registration, wherein the information includes information on one or more other alert consumer systems at which information associated with the at least one identified alert rule is made available, and wherein the one or more other alert consumer systems are monitored to identify and collect alert rule-relevant information associated with the at least one identified alert rule for further processing.

11. The computer program product of claim 10, wherein the distributed information associated with the at least one alert rule from the central rules repository comprises a first set of distributed information distributed to the at least one PI component associated with the at least one message inter-communication and a second set of distributed information distributed to the at least one alert consumer system associated with the identified at least one alert consumer registration.

12. The computer program product of claim 10, wherein in response to receiving the information associated with the at least one alert rule from the central rules repository, each of the at least one PI components associated with the at least one message inter-communication associated with the at least one alert rule evaluates the messages associated with a particular PI component based upon the at least one alert rule.

13. The computer program product of claim 12, wherein an alert event is generated at the particular PI component in response to a message satisfying the at least one alert rule.

14. The computer program product of claim 13, wherein the alert events are initially stored in the generic queue at the particular PI component.

15. The computer program product of claim 14, wherein the particular PI component associated with a particular alert rule receives, from the central rules repository, information identifying the at least one alert consumer registration associated with the particular alert rule; and further wherein, the particular PI component creates a sub-queue of the one or more associated sub-queues, the sub-queue specific to the at least one identified alert consumer registration.

16. The computer program product of claim 15, further comprising: analyzing the generic queue at the particular PI component to identify at least one alert event associated with the at least one alert consumer registration; and
moving a copy of the at least one identified alert event to the sub-queue specific to the at least one identified alert consumer registration.

17. The computer program product of claim 16, wherein the at least one alert event is associated with at least two different alert consumer registrations wherein a copy of the at least one identified alert event is moved to at least two different sub-queues.

18. The computer program product of claim 16, wherein the at least one identified alert event is removed from the generic queue after moving the copy of the at least one identified alert event.

19. A system, comprising:
one or more computers and a computer-readable medium coupled to the one or more computers having instructions stored thereon which, when executed by the one or more computers, cause the one or more computers to perform operations comprising:
identifying at least one alert rule at a central rules repository, the at least one alert rule associated with at least one message inter-communication within a process integration (PI) domain, wherein the PI domain includes at least one PI component, wherein the message inter-communications within the PI domain occur between PI components, wherein the at least one PI component contains a generic queue and one or more associated sub-queues generated based on at least one
identified at least one alert consumer registration associated with at least remote one alert consumer system for at least one of the identified alert rules at the central rules repository, wherein the generic queue and the at least one sub-queue are analyzed with a housekeeping algorithm using one or more housekeeping rules to maintain a size and age of the respective queues, where the housekeeping algorithm includes a determination of the size of the respective queues and the age of the at least one alert event included therein, and wherein the housekeeping algorithm creates a housekeeping event once a threshold determined from the one or more housekeeping rules is exceeded, the housekeeping event collecting and aggregating a subset of data and information included within alert messages remaining within a specific queue when the housekeeping event is created; and
distributing information associated with the at least one identified alert rule from the central rules repository to the at least one PI component associated with the at least one message inter-communication associated with the at least one alert rule and to the at least one alert consumer system associated with the identified at least one alert consumer registration, wherein the information includes information on one or more other alert consumer systems at which-information associated with the at least one identified alert rule is made available, and wherein the one or more other alert consumer systems are monitored to identify and collect alert rule-relevant information associated with the at least one identified alert rule for further processing.

* * * * *